(12) United States Patent
Bergstrom

(10) Patent No.: US 7,653,561 B2
(45) Date of Patent: Jan. 26, 2010

(54) STOCHASTIC MULTIPLE CHOICE KNAPSACK ASSORTMENT OPTIMIZER

(75) Inventor: John M. Bergstrom, Hoffman Estates, IL (US)

(73) Assignee: Accenture Global Services GmbH, Schaffhausen (CH)

( * ) Notice: Subject to any disclaimer, the term of this patent is extended or adjusted under 35 U.S.C. 154(b) by 384 days.

(21) Appl. No.: 10/021,917

(22) Filed: Dec. 13, 2001

(65) Prior Publication Data

US 2002/0156667 A1    Oct. 24, 2002

Related U.S. Application Data

(60) Provisional application No. 60/255,624, filed on Dec. 13, 2000.

(51) Int. Cl.
*G06F 9/44* (2006.01)

(52) U.S. Cl. .......................................................... 705/7

(58) Field of Classification Search ...................... 705/7
See application file for complete search history.

(56) References Cited

U.S. PATENT DOCUMENTS

| | | | |
|---|---|---|---|
| 3,705,410 A | 12/1972 | Kooy et al. | |
| 4,723,819 A * | 2/1988 | Ramberg | 312/130 |
| 4,745,555 A | 5/1988 | Connelly et al. | |
| 4,885,686 A | 12/1989 | Vanderbei | |
| 5,148,365 A * | 9/1992 | Dembo | 705/36 |
| 5,216,593 A * | 6/1993 | Dietrich et al. | 345/467 |
| 5,241,467 A * | 8/1993 | Failing et al. | 705/1 |
| 5,471,408 A | 11/1995 | Takamoto et al. | |
| 5,537,593 A | 7/1996 | Diamond et al. | |
| 5,615,109 A | 3/1997 | Eder | |
| 5,775,504 A * | 7/1998 | Menaged | 206/495 |
| 5,886,902 A | 3/1999 | Turini | |
| 6,032,123 A | 2/2000 | Jameson | |
| 6,044,357 A * | 3/2000 | Garg | 705/10 |
| 6,078,905 A | 6/2000 | Pich-LeWinter | |
| 6,219,649 B1 | 4/2001 | Jameson | |
| 6,321,207 B1 | 11/2001 | Ye | |
| 6,341,269 B1 * | 1/2002 | Dulaney et al. | 705/22 |
| 6,374,227 B1 | 4/2002 | Ye | |

(Continued)

FOREIGN PATENT DOCUMENTS

WO    WO 00/43934    7/2000

OTHER PUBLICATIONS

Zoltners et al., "Integer Programming Models for Sales Resource Allocation," Management Science, Mar. 1980 [retrieved from Proquest].*

(Continued)

*Primary Examiner*—Scott L Jarrett
(74) *Attorney, Agent, or Firm*—Banner & Witcoff Ltd

(57) ABSTRACT

A method of determining allocations in a business operation to maximize profit includes: collecting profit data for a plurality of classes in the business operation, where each class includes an allocation having a cost function and each allocation belongs to the group consisting of physical allocations and economic allocations; determining profit functions for the allocations from the profit data; formulating a Multiple Choice Knapsack Problem to maximize profit from the profit functions, the cost functions, and a cost constraint; and solving the Multiple Choice Knapsack Problem to determine values for the allocations.

47 Claims, 13 Drawing Sheets

U.S. PATENT DOCUMENTS

| | | | | |
|---|---|---|---|---|
| 6,609,101 | B1 * | 8/2003 | Landvater | 705/10 |
| 6,826,538 | B1 * | 11/2004 | Kalyan et al. | 705/7 |
| 6,952,821 | B2 * | 10/2005 | Schreiber | 717/151 |
| 2001/0047293 | A1 * | 11/2001 | Waller et al. | 705/10 |

OTHER PUBLICATIONS

Bultez et al., "SH.A.R.P. : Shelf Alocation for Retailers' Profit," Marketing Science, Summer 1988 [retrieved from Proquest].*

Hillier et al., "Introduction To Operations Research" (1995).*

Bradford et al. "A Bayesian Approach to the Two-Period Style-Goods Inventory Problem with Single Replenishment and Heterogeneous Poisson Demand," The Journal of Operational Research Society, Mar. 1990 [retrieved from Proquest].*

Kim, Se-Kwon. "An analysis of inventory stockout models, "The Pennsylvania State University, 1991 [retrieved from Proquest].*

"Profits per square foot for frozen 40-50% higher than grocery: Study," Frozen Food Age, Nov. 1995.*

"Choosing a Yardstick to Assess Productivity," Chain Store Age Executive with Shopping Center Age, Sep. 1984.*

Flickinger, Burt P III. "Rethinking Retailing," Progressive Grocer, Mar. 1995.*

Bean. J.C. et al.,. Selecting Tenants in a Shopping Mall The University of Michigan, May 1987.*

Dudzinksi K. et al., An algorithm for Multiple Choice Knapsack Problem Lecture Notes in Control and Information Sciences, vol. 59, 1984.*

Buttle, Francis, Retail Space Allocation International Journal of Physical Distribution & Materials Management, vol. 14. No. 4, 1984.*

Bean, J.C. et al., A Hybrid Algorithm for the Multiple Choice Knapsack Problem The University of Michigan, Technical Report 90-33, Nov. 1990.*

Hansen, Pierre et al., Product Selection and Space Allocation in Supermarkets European Journal of Operations Research, vol. 3, No. 6, Nov. 1979.*

Crostjens, Marcel et al., A Dynamic Model for Strategically Allocating Retail Space The Journal of the Operational Research Society, vol. 34, No. 10, Oct. 1983.*

Curhan, Ronald C., Shelf Space Allocation and Profit Maximization in Mass Retailing Journal of Marketing, vol. 37, No. 3, Jul. 1973.*

Armstrong, R.D. et al., A Computational Study of a Multiple-Choice Knapsack Problem ACM Transactions on Mathematical Software, vol. 9, No. 2, Jun. 1983.*

Johnson, Marcia Walker, Resource Allocation Models for Retail Planning: Optimal Assortment Planning and Display Space Allocation and Optimal Allocation of Catalog Advertising Space, Northwestern Univeristy, AAT 8225946, 1982.*

Kleywegt, Anton J. et al., The Dynamic and Stochastic Knapsack Problem Operations Research, vol. 46, No. 1, Jan./Feb. 1998.*

Borin, Norm et al., A Model for Determining Retail Product Category Assortment and Shelf Space Allocation Decision Sciences, vol. 25, No. 3, May/Jun. 1994.*

Bean, J.C., Multiple Choice Knapsack Functions The University of Michigan, Technical Report 87-26, Oct. 1987.*

Martello, Silvano et al., Knapsack Problems: Algorithms and Computer Implementations John Wiley & Sons, 1990, ISBN: 0-471-92420-2.*

Zufryden, Fred S., A Dynamic Programming Approach for Product Selection and Supermarket Shelf-Space Allocation The Journal of the Operational Research Socity, vol. 37, No. 4, Apr. 1986.*

Corstjens, Marcel et al., A Model For Optimization Retail Space Allocations Management Science, vol. 27, No. 7, Jul. 1981.*

Pisinger, David, A Minimal Algorithm for the Multiple-Choice Knapsack Problem University of Copenhagen, Technical Report 94/25, May 1994.*

Consumer Insight, "The Assortment Challenge: Marrying Supply Cost with Consumer Demand", Sep. 1999,9 pgs.

T. H. Cormen et al., "Introduction to Algorithms", MIT Press, 1990, book.

D. Pisinger et al., "Knapsack Problems" in "Handbook of Combinatorial Optimization", vol. 1, D.-Z. Du et al. (eds.), Kluwer Academic Publishers, 1998, pp. 299-428.

R. Fletcher, "Practical Methods of Optimization", 2nd ed. J. Wiley and Sons, 1987, book.

F. S. Hillier et al., "Introduction to Operations Research", McGraw-Hill, N. Y., 1995, book.

R. G. Parker, "Discrete Optimization", Academic Press, 1988, book.

U. Pferschy, "Dynamic Programming Revisited: Improving Knapsack Alorithms", Computing 63, 1999, pp. 419-430.

D. Pisinger, "A minimal algorithm for the Multiple-Choice Knapsack Problem", Eu J. of Operational Research 83, 1995, pp. 394-410.

* cited by examiner

Assortment Recommendation with Optimal Profit

| Class 1 | | Class 2 | | Class 3 | | ... Class N | |
|---|---|---|---|---|---|---|---|
| Attribute 1 | Attribute 2 | Attribute 1 | Attribute 2 | Attribute 1 | Attribute 2 | Attribute 1 | Attribute 2 |
| 0 | 0 | 1000 | 2000 | 0 | 0 | | |
| 1500 | 3500 | 1500 | 3000 | 3500 | 6000 | | |
| 2500 | 5400 | 2000 | 4000 | 99999 | -10000 | | |
| 3500 | 7100 | 2500 | 4750 | 99999 | -10000 | | |
| 4500 | 9000 | 3000 | 5500 | 99999 | -10000 | | |
| 5500 | 1000 | 3500 | 6000 | 99999 | -10000 | | |
| 6500 | 10500 | 4000 | 6000 | | | | |
| ... | ... | ... | ... | ... | | | |

Objective: Maximize Attribute 2 Sum
Constraint: Attribute 1 Sum (<, >, =) Limit

| | Problem Description | Class | Attribute 1 | Attribute 2 | Constraint |
|---|---|---|---|---|---|
| 610 | Assortment Optimization, Dimensionally Constrained | Item | Width | Profit | Total Width Of Item Holding Fixture |
| 612 | Assortment Optimization, Budget Constrained | Item | cost | Profit | Total Budget Available For Items |
| 614 | Start Of Season Budget Allocation | Department | cost | Profit | Total Budget Available For Merchandise |
| 616 | Retail Floor Space Optimization | Department | Width or Area | Profit | Total Floor Space (Width or Area) Of Store |
| 618 | Advertising Space Allocation | Item | Ad Area | Profit | Total Area Of Advertisement Brochure |
| 620 | Catalog Space Allocation | Item | Ad Area | Profit | Total Area Of Catalog Pages |
| 622 | Portfolio Of Loans Extended By A Bank | Applicant | Loan | Profit | Total Loan Budget |
| 624 | Merchandise Allocation To Stores From Warehouse | Store | Units Shipped | Profit | Total Units In The Wharehouse |

| Include | Item ID | Item Description | Item Type | Total Lifecycle | Cost | Width | Height | Capacity | Mandatory | Estimate Type | Resupply Factor | MOQ | Incr Order Qty | Min Shelf Presence | Holding Cost | Vendor Lead Time | Start Sell Date | Nbr Of Stores | Pack Size |
|---|---|---|---|---|---|---|---|---|---|---|---|---|---|---|---|---|---|---|---|
| 1 | 411 | FlatClassicFitChinoA | F | 26 | 14.12 | 1 | 1 | 1 | T | S | 1 | 1200 | 48 | 1 | 0 | 4 | 02012001 | 90 | 6 |
| 1 | 412 | FlatRelaxedFitChinoA | R | 26 | 14.03 | 1 | 1 | 1 | F | S | 1 | 400 | 48 | 1 | 0 | 4 | 02012001 | 90 | 6 |
| 1 | 414 | PleatedClassicFitChinoA | R | 26 | 14.05 | 1 | 1 | 1 | F | S | 1 | 400 | 48 | 1 | 0 | 4 | 02012001 | 120 | 6 |
| 1 | 415 | PleatedRelaxedFitChinoA | R | 26 | 13.44 | 1 | 1 | 1 | T | S | 1 | 400 | 48 | 1 | 0 | 4 | 02012001 | 120 | 6 |
| 1 | 421 | FlatClassicFitChinoB | F | 26 | 13.78 | 1 | 1 | 1 | F | S | 1 | 400 | 48 | 1 | 0 | 4 | 02012001 | 90 | 6 |
| 1 | 422 | FlatRelaxedFitChinoB | F | 26 | 14.16 | 1 | 1 | 1 | T | S | 1 | 400 | 48 | 1 | 0 | 4 | 02012001 | 90 | 6 |
| 1 | 423 | FlatTailoredFitChinoB | F | 26 | 16.64 | 1 | 1 | 1 | F | S | 1 | 400 | 48 | 1 | 0 | 4 | 02012001 | 60 | 6 |
| 1 | 424 | PleatedClassicFitChinoB | R | 26 | 13.52 | 1 | 1 | 1 | F | S | 1 | 400 | 48 | 1 | 0 | 4 | 02012001 | 90 | 6 |
| 1 | 425 | PleatedRelaxedFitChinoB | R | 26 | 14.79 | 1 | 1 | 1 | T | S | 1 | 400 | 48 | 1 | 0 | 4 | 02012001 | 90 | 6 |
| 1 | 426 | PleatedTailoredFitChinoB | F | 26 | 15.5 | 1 | 1 | 1 | T | S | 1 | 400 | 48 | 1 | 0 | 4 | 02012001 | 60 | 6 |
| 1 | 431 | ClassicFitJean | R | 26 | 11.34 | 1 | 1 | 1 | T | S | 1 | 400 | 48 | 1 | 0 | 4 | 02012001 | 120 | 6 |
| 1 | 432 | RelaxedFitJean | R | 26 | 13.75 | 1 | 1 | 1 | F | S | 1 | 400 | 48 | 1 | 0 | 4 | 02012001 | 120 | 6 |
| 1 | 433 | BootLegJean | F | 26 | 12.96 | 1 | 1 | 1 | F | S | 1 | 400 | 48 | 1 | 0 | 4 | 02012001 | 60 | 6 |
| 1 | 434 | BaggyFitJean | F | 26 | 13.5 | 1 | 1 | 1 | F | S | 1 | 400 | 48 | 1 | 0 | 4 | 02012001 | 90 | 6 |
| 1 | 471 | PleatherPant | F | 13 | 11.66 | 1 | 1 | 1 | T | S | 1 | 400 | 48 | 1 | 0 | 4 | 02012001 | 60 | 6 |

FIG. 7

| Item ID | Entry Type | Nbr of Entries | Week 1 | Week 2 | Week 3 | ... | Week 26 |
|---|---|---|---|---|---|---|---|
| 411 | DEMAND | 1 | 2390 | | | | |
| 411 | PROMO | 1 | 0 | | | | |
| 411 | PRICE | 1 | 24 | | | | |
| 412 | DEMAND | 26 | 1210 | 0 | 1210 | ... | 1210 |
| 412 | PROMO | 26 | 0 | 1625 | 0 | ... | 0 |
| 412 | PRICE | 26 | 45 | 30 | 45 | ... | 45 |
| : | : | : | : | : | | | |
| 432 | DEMAND | 1 | 1420 | | | | |
| 432 | PROMO | 1 | 0 | | | | |
| 432 | PRICE | 1 | 27 | | | | |
| 433 | DEMAND | 26 | 125 | 500 | 400 | ... | 25 |
| 433 | PROMO | 26 | 0 | 0 | 0 | ... | 0 |
| 433 | PRICE | 26 | 39 | 39 | 39 | ... | 39 |
| 434 | DEMAND | 26 | 500 | 1000 | 950 | ... | 75 |
| 434 | PROMO | 26 | 0 | 0 | 0 | ... | 0 |
| 434 | PRICE | 26 | 22 | 22 | 22 | ... | 15 |
| 471 | DEMAND | 1 | 1430 | | | | |
| 471 | PROMO | 1 | 0 | | | | |
| 471 | PRICE | 1 | 27 | | | | |

FIG. 8

| Field | Value |
|---|---|
| Periods of Supply: | 2.5 |
| Periods per Window: | 3 |
| Number of Simulation Trials: | 10 |
| Interest Rate: | 0.1 |
| Date the Buys Will be Placed: | 01012001 |
| Operating Hours per Period: | 84 |
| Stock Clerk Success Rate: | 0.8 |
| Stock Clerk Cycle Time: | 4 |
| Stock Clerk Trigger Value: | 0 |

FIG. 9

| Item ID 1504 | Item Description 1506 | Choice 1902 | Index 1904 | Profit 1906 | Cost 1908 | Units 1910 |
|---|---|---|---|---|---|---|
| 411 | FlatClassicFitChinoA | 0 | 0 | 11856 | 16944 | 1200 |
| 411 | FlatClassicFitChinoA | 1 | 0 | 12330.24 | 17621.76 | 1248 |
| 411 | FlatClassicFitChinoA | 2 | 0 | 12804.48 | 18299.52 | 1296 |
| 411 | FlatClassicFitChinoA | 3 | 0 | 13278.72 | 18977.28 | 1344 |
| ... | ... | ... | ... | ... | ... | ... |
| 411 | FlatClassicFitChinoA | 22 | 0 | 22226.88 | 31854.72 | 2256 |
| 411 | FlatClassicFitChinoA | 23 | 0 | 22432.32 | 32532.48 | 2304 |
| 411 | FlatClassicFitChinoA | 24 | 0 | 22464.96 | 33210.24 | 2352 |
| 411 | FlatClassicFitChinoA | 25 | 0 | 22250.4 | 33888 | 2400 |
| ... | ... | ... | ... | ... | ... | ... |
| 411 | FlatClassicFitChinoA | 48 | 0 | 7545.12 | 49476.48 | 3504 |
| 411 | FlatClassicFitChinoA | 49 | 0 | 6867.36 | 50154.24 | 3552 |
| 412 | FlatRelaxedFitChinoA | 0 | 1 | 0 | 0 | 0 |
| 412 | FlatRelaxedFitChinoA | 1 | 1 | 14484.18 | 16976.3 | 1210 |
| 412 | FlatRelaxedFitChinoA | 2 | 1 | -1000000 | 1000000 | -999999 |
| 412 | FlatRelaxedFitChinoA | 3 | 1 | -1000000 | 1000000 | -999999 |
| ... | ... | ... | ... | ... | ... | ... |
| 412 | FlatRelaxedFitChinoA | 48 | 1 | -1000000 | 1000000 | -999999 |
| 412 | FlatRelaxedFitChinoA | 49 | 1 | -1000000 | 1000000 | -999999 |
| 414 | PleatedClassicFitChinoA | 0 | 2 | 0 | 0 | 0 |
| 414 | PleatedClassicFitChinoA | 1 | 2 | 9452.9 | 13347.5 | 950 |
| ... | ... | ... | ... | ... | ... | ... |
| 434 | BaggyFitJean | 48 | 13 | -1000000 | 1000000 | -999999 |
| 434 | BaggyFitJean | 49 | 13 | -1000000 | 1000000 | -999999 |
| 471 | PleatherPant | 0 | 14 | 4136 | 4664 | 400 |
| 471 | PleatherPant | 1 | 14 | 4632.32 | 5223.68 | 448 |
| ... | ... | ... | ... | ... | ... | ... |
| 471 | PleatherPant | 49 | 14 | -1000000 | 1000000 | -999999 |

FIG. 11

| Item ID | Item Description | Choice | Index | Profit | Cost | Units |
|---|---|---|---|---|---|---|
| 411 | FlatClassicFitChinoA | 1 | 0 | 12330 | 17620 | 1248 |
| 412 | FlatRelaxedFitChinoA | 1 | 1 | 14484 | 16980 | 1210 |
| 414 | PleatedClassicFitChinoA | 0 | 2 | 0 | 0 | 0 |
| 415 | PleatedRelaxedFitChinoA | 0 | 3 | 1210 | 16260 | 1210 |
| 421 | FlatClassicFitChinoB | 14 | 4 | 11449 | 14110 | 1024 |
| 422 | FlatRelaxedFitChinoB | 9 | 5 | 9019 | 11780 | 832 |
| 423 | FlatTailoredFitChinoB | 8 | 6 | 11241 | 12250 | 736 |
| 424 | PleatedClassicFitChinoB | 1 | 7 | 12859 | 15140 | 1120 |
| 425 | PleatedRelaxedFitChinoB | 0 | 8 | 860 | 12720 | 860 |
| 426 | PleatedTailoredFitChinoB | 7 | 9 | 12144 | 11410 | 736 |
| 431 | ClassicFitJean | 0 | 10 | 960 | 10890 | 960 |
| 432 | RelaxedFitJean | 1 | 11 | 18817 | 19520 | 1420 |
| 433 | BootLegJean | 6 | 12 | 8762 | 8290 | 640 |
| 434 | BaggyFitJean | 20 | 13 | 17701 | 17710 | 1312 |
| 471 | PleatherPant | 19 | 14 | 13245 | 15300 | 1312 |

FIG. 13

STOCHASTIC MULTIPLE CHOICE KNAPSACK ASSORTMENT OPTIMIZER

CROSS-REFERENCE TO RELATED APPLICATIONS

The present application claims priority from U.S. Provisional Application No. 60/255,624, titled "Stochastic multiple choice knapsack assortment optimizer," filed Dec. 13, 2000.

TECHNICAL FIELD

The present invention relates to data processing generally, and more particularly, to data processing for resource optimization.

BACKGROUND ART

Combinatorial problems and various discrete solution systems are well known in the art of operations research and the art of optimization generally. (T. H. Cormen, C. E. Leiserson and R. L. Rivest, *Introduction to Algorithms,* MIT Press, Massachusetts, 1990; R. Fletcher, *Practical Methods of Optimization,* 2nd edition, John Wiley and Sons, Chichester, 1987; Hillier, F. S., and Lieberman, G. J., *Introduction to Operations Research,* McGraw-Hill, New York, 1995; R. G. Parker and R. L Rardin, *Discrete Optimization,* Academic Press, Boston, 1988; *Handbook of Combinatorial Optimization,* vol. 1, D.-Z. Du and P. M. Pardalos, eds., Kluwer Academic Publishers, Drodrecht, 1998.)

In many business applications, however, combinatorial optimization presents substantial challenges in that the computational resources and time required to develop an acceptable solution are typically unacceptable. Several approaches to providing a rapid solution to a combinatorial problem include the use of parallel digital processors to solve such problems as articulated in U.S. Pat. No. 5,537,593 issued to FMC Corporation™ on Jul. 16, 1996. IBM™ Corporation has received numerous patents on various methods of optimizing inventory and materials requirements planning (MRP), which are basically resource allocation problems, such as U.S. Pat. No. 5,216,593 issued Jun. 1, 1993. Others have received patents on neurocomputers suitable for solving an optimum combination problem. Nevertheless, the technical problem of developing a highly efficient and cost effective system and method for solving hard combinatorial problems remains.

In many business applications, traditional attempted solutions to technical combinatorial problems involving resource allocation rely on periodic static data, acquired after-the-fact, are based on cumbersome, dueling spreadsheets, and require extensive time to run scenarios of multiple resource allocation options. What is desired is an improved system and method to solve these technical combinatorial problems to achieve optimal resource allocation.

SUMMARY OF THE INVENTION

In one embodiment of the present invention, a method of determining allocations in a business operation to maximize profit includes: collecting profit data for a plurality of classes in the business operation, where each class includes an allocation having a cost function and each allocation belongs to the group consisting of physical allocations and economic allocations; determining profit functions for the allocations from the profit data; formulating a Multiple Choice Knapsack Problem to maximize profit from the profit functions, the cost functions, and a cost constraint; and solving the Multiple Choice Knapsack Problem to determine values for the allocations.

According to one aspect, determining the profit functions includes: determining demand distributions for the allocations from the profit data; and determining each profit function from a corresponding demand distribution. The demand distributions may depend on probability distributions such as Poisson models, normal distribution models, and Markov models according to the requirements of the operational setting (e.g., Poisson models and normal distribution models for non-replacement or fashion retail and Markov models for replacement or commodity retail).

According to another aspect the spatial allocations may include spatial allotments (e.g., widths of shelves). The method may be further specialized so that all allocations are physical allocations.

According to another aspect, the economic allotments may include monetary allotments (e.g., dollar amounts). The method may be further specialized so that all allocations are economic allocations.

According to another aspect, the cost constraint may be further specified as a greater-than-or-equal-to inequality, an equality, or a less-than-or-equal-to inequality.

In another embodiment of the present invention, a system for determining allocations in a business operation to maximize profit, includes: a data unit, a profit-model unit, and an optimization-engine unit. The data unit has a memory that includes profit data for multiple classes in the business operation, where each class includes an allocation having a cost function that is stored in the memory. The memory also including a cost constraint. The profit-model unit, which is connected to the data unit, includes executable instructions for determining profit functions for the allocations from the profit data. The optimization-engine unit, which is connected to the data unit and the profit-model unit, includes executable instructions for formulating a Multiple Choice Knapsack Problem to maximize profit from the profit functions, the cost functions, and the cost constraint, and for solving the Multiple Choice Knapsack Problem to determine values for the allocations. This embodiment of the present invention may include aspects described above. For example, the allocations may be exclusively physical allocations or exclusively economic allocations or some combination thereof.

In another embodiment of the present invention, computer-readable media tangibly embodies a program for determining allocations in a business operation to maximize profit. The program including executable instructions for: collecting profit data for a plurality of classes in the business operation, where each class includes an allocation having a cost function; determining profit functions for the allocations from the profit data; formulating a Multiple Choice Knapsack Problem to maximize profit from the profit functions, the cost functions, and a cost constraint; and solving the Multiple Choice Knapsack Problem to determine values for the allocations. This embodiment of the present invention may include aspects described above. For example, the allocations may be exclusively physical allocations or exclusively economic allocations or some combination thereof.

The present invention enables optimal resource allocation in a variety of business operations to maximize profit while constraining cost, where resources may include economic and physical allocations, and where profit and cost may be defined in a number of ways.

BRIEF DESCRIPTION OF THE DRAWINGS

FIG. 4 shows an exemplary solution to a generalized problem associated with an embodiment of the invention.

FIG. 5 shows other exemplary business problems that may be solved by an embodiment of the invention.

FIG. 7 shows an exemplary item attribute table associated with an embodiment of the invention.

FIG. 8 shows an exemplary item demand and price table associated with an embodiment of the invention.

FIG. 9 shows an exemplary system attribute table associated with an embodiment of the invention.

FIG. 11 shows an exemplary item choice table associated with an embodiment of the invention.

FIG. 13 shows an exemplary optimal solution table associated with an embodiment of the invention.

DETAILED DESCRIPTION OF EXEMPLARY EMBODIMENTS

1. Invention Overview

The present invention provides a method and system for performing stochastic optimization, and in particular, assortment optimization including the determination of physical and economic allocations to maximize profit in a business operation. In the following description, numerous details are set forth in order to enable a thorough understanding of the present invention. However, it will be understood by those of ordinary skill in the art that these specific details are not required in order to practice the invention. Further, well-known elements, devices, process steps and the like are not set forth in detail in order to avoid obscuring the present invention.

Figure 1:
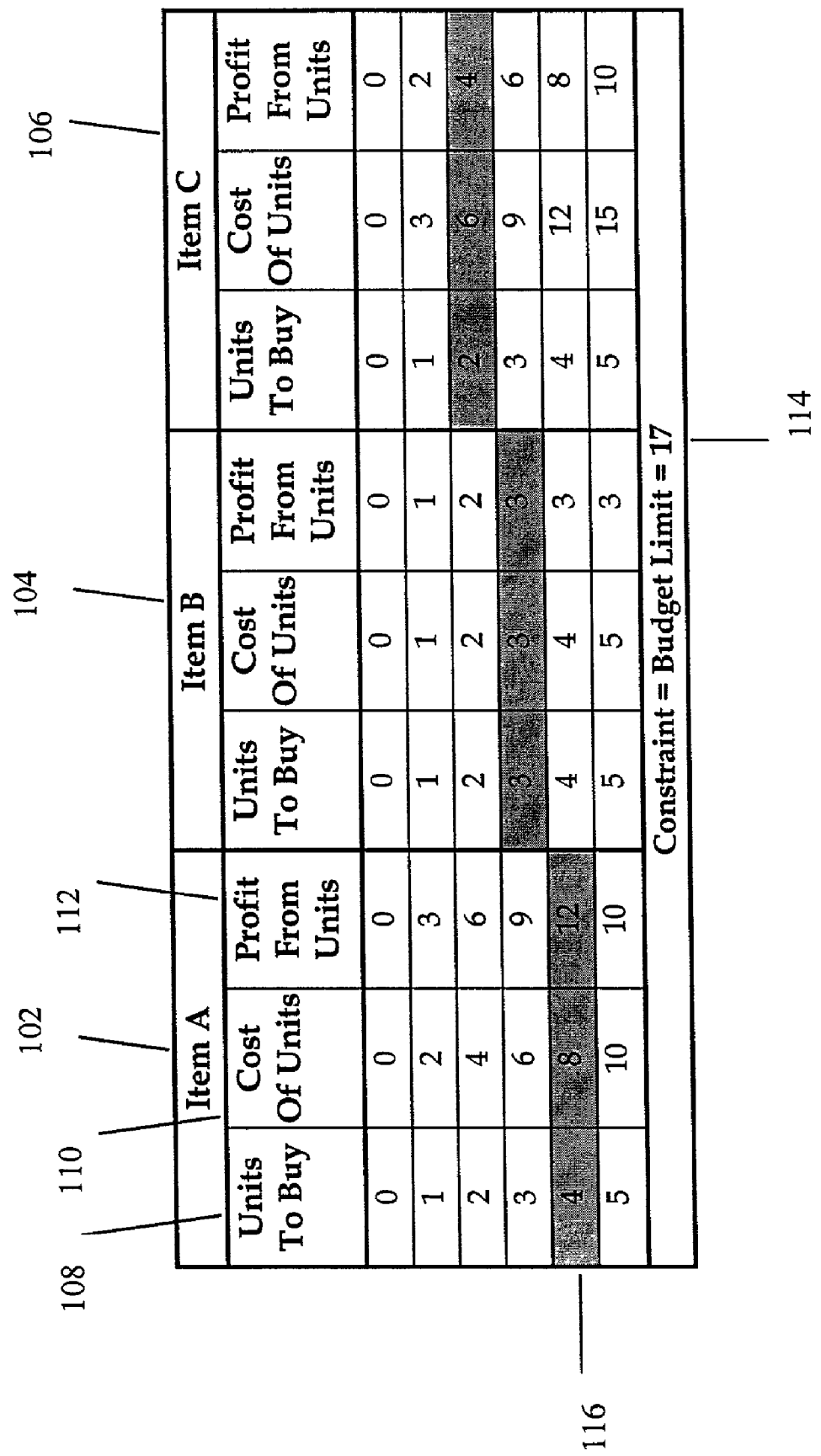
FIG. 1 shows a view of different combinations of unit quantities, cost of units, and profit from units associated with assortment optimization performed by an embodiment of the invention.

FIG. 1 shows an optimization problem in spreadsheet form according to an embodiment of the present invention. For example, a retail buyer in a business operation may have an assortment choice for stocking three products: item A 102, item B 104, and item C 106. For each of these items, the buyer may choose how many units to buy 108 for which there is a corresponding cost 110 and a corresponding profit 112. Typically the cost data is imposed on the buyer, for example, by a distributor. The data for the cost for each item may be a simple linear function of the number of units as shown for items A, B, and C, or the cost function may reflect other factors such as a discount for volume purchases.

Analogously, the data for the profit for each item may be a simple linear function of the number of items as illustrated by the profit column for Item C 106. More realistically, however, the profit data is a complex result of multiple factors including demand, competition and overhead costs, whether static or seasonal. Thus, for Item B 104 the profit levels at a saturation value of three units, and for Item A 102 the profit actually decreases at a breakpoint value of four units. Realistic estimates for profit values may require substantial empirical analysis of market trends or at least a sensitivity to seasonal fluctuations.

A cost constraint 114 is imposed as a budget limit on the total cost of all the items bought. Then FIG. 1 illustrates the problem of choosing how many units to buy for each of three items 102, 104, 106, to maximize the total profit where the total cost is constrained. That is, for each item the buyer chooses the number of units to buy (i.e., from each item's units-to-buy column) to maximize the total profit (i.e., a sum of values from each item's profit column) subject to the constraint 114 on the total cost (i.e., a sum of values from each item's cost column). For the example shown is FIG. 1, there are $6^3=216$ possible choices (i.e., from 0 to 5 for each item) and the optimal result 116 is highlighted.

The optimization problem illustrated in FIG. 1 has the structure of a Multiple Choice Knapsack Problem (MCKP). Typically the MCKP is formulated as:

$$\text{maximize} \sum_{i=1}^{k} \sum_{j \in N_i} p_{ij} x_{ij} \quad (1\text{-}1)$$

$$\text{subject to} \sum_{i=1}^{k} \sum_{j \in N_i} w_{ij} x_{ij} \leq c$$

$$\sum_{j \in N_i} x_{ij} = 1 \ i = 1, \ldots, k,$$

$$x_{ij} \in \{0, 1\}, \quad i = 1, \ldots, k, j \in N_i$$

In Eq. (1-1) there are k classes $N_i$ (i=1, . . . , k) of items corresponding to the three items 104, 106, 108 in FIG. 1. Each $j \in N_i$ corresponds to a row index for an item in FIG. 1. The allocation variable $x_{ij}$ has the value 1 if and only if the allocation from row j is chosen for the class $N_i$ analogously to the highlighted solution 116 in FIG. 1. The parameters $p_{ij}$, $w_{ij}$, and c in (P1) can likewise be identified with the entries in FIG. 1. The profit $p_{ij}$ can be identified with the profit columns in FIG. 1, the weight $w_{ij}$ can be identified with the cost columns in FIG. 1, and the capacity (or cost) c can be identified with the cost constraint 114 in FIG. 1. Thus, the example shown in FIG. 1 can be fit generally into the class of Multiple Choice Knapsack Problems. In general, such problems are computationally difficult to solve as characterized by the complexity level NP-hard. However, as discussed in greater detail below, practically useful methods can be implemented to solve realistic problems in many operational settings.

Figure 2:
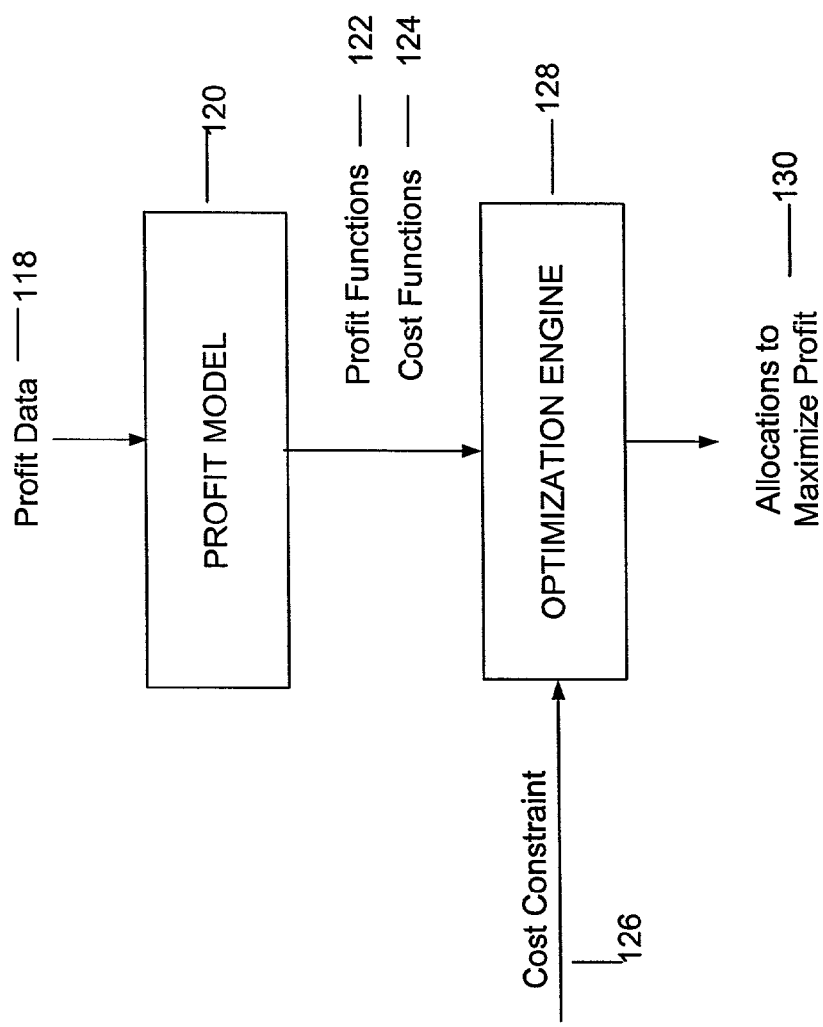
FIG. 2 shows an exemplary process overview of an embodiment of the invention.

FIG. 2 shows an embodiment according to the present invention for solving the optimization problem shown in FIG. 1. Profit data 118 is received by a Profit Model 120 and used to determine profit functions 122, which may be identified with the profit columns 112 in FIG. 1, and cost functions, which may be identified with the cost columns 110 of FIG. 1. An optimization engine 128 receives the profit functions 122, the cost functions 124 and additionally a cost constraint 124 which may be identified with the cost constraint 114 of FIG. 1 The optimization engine 128 determines allocations to maximize profit 128 (e.g., by solving Eq. (1-1)), which may be identified with the optimal solution 116 shown in FIG. 1 (i.e., the allocations of units to buy).

Further details associated with the components of the embodiment shown in FIG. 2 are presented below.

2. Profit Models

Profit models 120 of varying complexity may be used to determine profit functions 122 according to the present invention. Additionally cost functions 124 are also obtained, often as an intermediate step in the determination of the profit functions 122 or as a direct (and simpler) calculation from the profit data 118. These models may rely on simple formulas that are easily implemented by spreadsheet as well as more complex stochastic modeling principles. For instance, an exemplary simple profit model A may use an invariant demand of D units for an item. Model A may use the assumption that a seller will sell any quantity of items that is purchased up to and including D units. Any units purchased over D would remain unsold. Profit for model A may be defined as:

$$\text{Profit} = \text{Sales Income} - \text{Cost Of Goods}. \quad (2\text{-}1)$$

Here the elements of Eq. (2-1) may be further defined by simple formulas that are easily implemented in a spreadsheet:

$$\text{Sales Income} = \text{units sold} * \text{average retail}$$

$$\text{Cost Of Goods} = \text{units purchased} * \text{average cost} \quad (2\text{-}2)$$

Increasingly complex profit models may also be used according the requirements of an operational setting. Probability distributions may be tailored to specific applications. For example, profit model B may use a fluctuating demand (e.g., units/week) that may be characterized by a probability distribution function having a mean equal to M and a variance equal to V. profit model B may calculate unit sales as an expected value over many time periods and define profit to include other factors as:

$$\text{Profit} = \text{Sales Income} - \text{Cost Of Goods} - \text{Freight} - \text{Carrying Cost} - \text{Other Costs}. \quad (2\text{-}3)$$

As another example, an exemplary profit model C according to an embodiment of the invention describes the total demand (in number of units) of an item over the full life cycle of the item as a Poisson distribution with mean=$\mu$. Then, the probability that the demand will exactly equal N units is given by the probability density function of the Poisson distribution evaluated at $\mu$ and N. (i.e., probability PDF[$\mu$,N]). Then if a buyer purchases a quantity of items equal to "Supply", then the expected number of units sold is:

$$\text{UnitSales} = \sum_{N=0}^{Supply-1} N \cdot PDF[\mu, N] + \sum_{N=Supply}^{\infty} Supply \cdot PDF[\mu, N] \quad (2\text{-}4)$$

From the value of UnitSales, other values including the Profit can be determined. For example, if the selling price of a single unit of the item is equal to UnitPrice, the sales income from the unit sales is given as:

$$\text{SalesIncome} = \text{UnitPrice} * \text{UnitSales} \quad (2\text{-}5)$$

Likewise, if the purchase cost of a single unit of the item is equal to UnitCost, the cost of purchasing M units (e.g., M=Supply) of the item is given as:

$$\text{InventoryCost} = \text{UnitPrice} * M \quad (2\text{-}6)$$

Then profit can be defined in terms of these quantities as:

$$\text{Profit} = \text{SalesIncome} - \text{InventoryCost} \quad (2\text{-}7)$$

Figure 3:
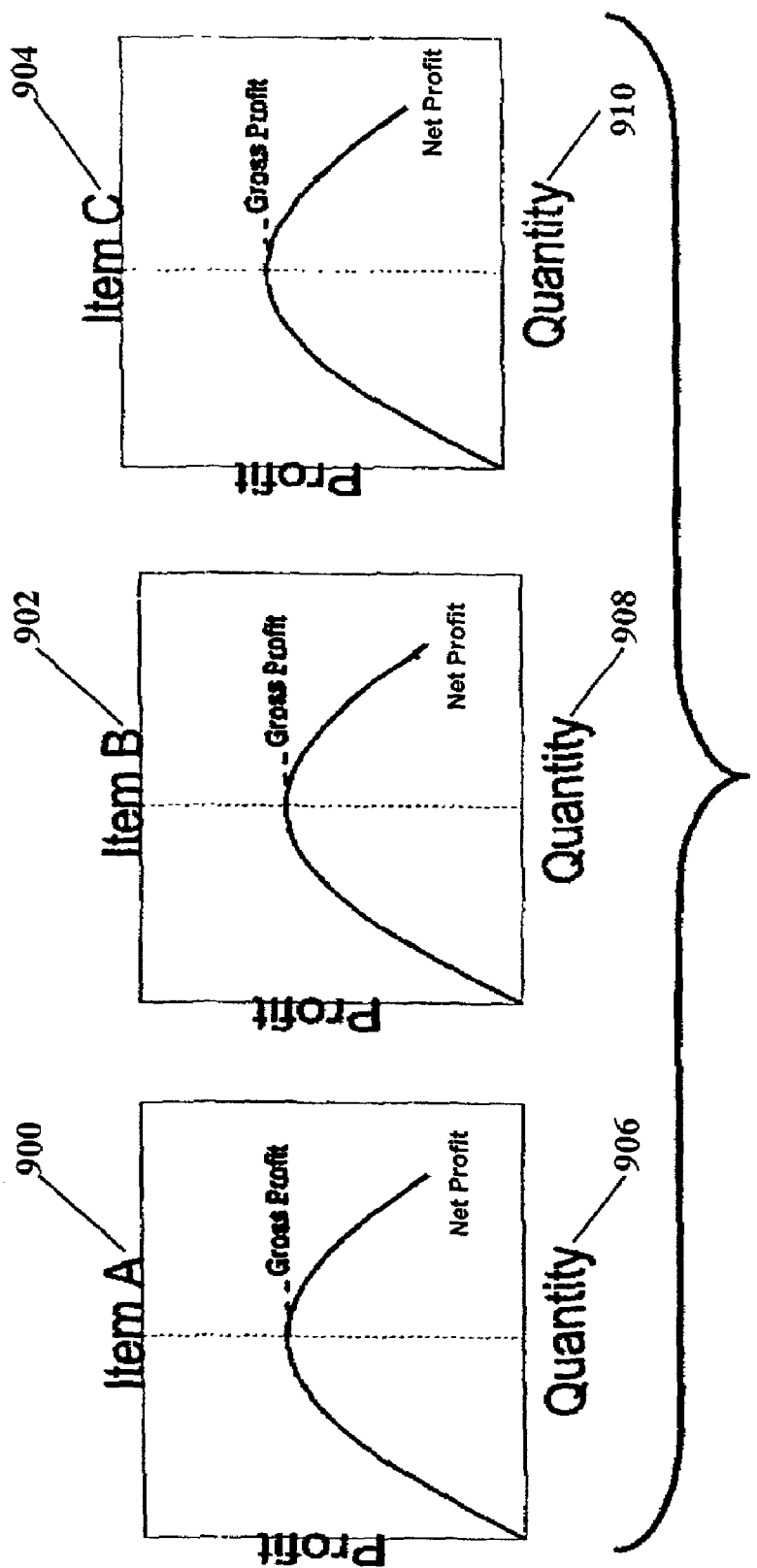
FIG. 3 shows an exemplary view of multiple profit curves generated for a set of items.

Eqs. (2-4)-(2-7) illustrate an embodiment of a profit model 120 that uses a probability distribution (e.g., a Poissson distribution) for the demand to create profit functions 122. Preferably the profit model 120 generates an independent demand distribution function for each class (or item), possibly by stochastic analysis using representative probability distributions as discussed above. Then from each demand distribution an independent profit function can be determined as discussed above. FIG. 3 shows an exemplary view of multiple profit curves generated for three distinct items 900, 902, 904. Then in the optimization engine 128 combinations of items 900, 902, 904 and quantities 906, 908, 910 are evaluated against a constraint entered by the user, and the optimizer engine returns the solution generating the optimal gross profit. (Note that FIG. 3 represents the profit functions as continuous curves although the optimization engine 128 takes discrete quantities as inputs as in the columns of FIGS. 1 and 3.)

The use of probability functions to model demand distributions in the profit model 120 may be tailored to specific operational settings and the corresponding availability of data. For example, the Poisson and normal distributions can be especially advantageous in the context a non-replenishment retail (or fashion retail) where the demand characteristics do not reflect continual replenishment. In many cases inventory is replenished as needed over a long period of time. Examples of this type of item include commodities such as aspirin and toothpaste. In these cases, as items are sold, an automated replenishment system typically places an order that initiates shipment of additional items to the store. Once the items arrive at the store, a stock clerk places some or all of them on a shelf in the sales area of the store. Customers arriving at random times deplete the on-shelf supply causing the replenishment system to begin the cycle again by ordering additional items. Since items of this type are frequently displayed in designated fixed-width areas on a shelf, the retailer must decide how much width to allocate to each item that goes on the shelf. In some cases the best decision is to allocate shelf width equal to the width of a single unit of the item. In other cases the retailer may wish to dedicate enough width so that two or more units may be placed beside each other on the shelf. In retail terminology this is referred to as deciding how many "facings" of an item will be placed on the shelf. In this scenario, the profit model calculates the profitability of each item as a function of the number of facings that are included on the shelf. More specifically the profit model calculates the profitability as a function of the shelf width occupied by the facings.

In the literature there are examples of modeling the inventory replenishment process by using Markov chains. (Hillier, F. S., and Lieberman, G. J., Introduction to Operations Research, McGraw-Hill, New York, 1995.) For example, if the state of the system is defined as the number of units of an item that are on the shelf immediately following a restock cycle, a Markov transition matrix for a Markov chain can be used to model the demand and on-shelf supply between restocking the item. By calculating the stationary probabilities of this matrix, one can determine the probability of finding any given number of units of the item on the shelf. This piece of information, combined with the probability density function of the demand for the time interval between restocking cycles, allows one to calculate the expected sales of the item, and then its profitability.

An advantage of using of Markov chains is that one can calculate the profitability very quickly and accurately on a computer. In some situations, however, the behavior of the shelf re-supply process may be sufficiently complex so that it is easier to create a profit model from a simulation (e.g., a Monte Carlo simulation). In this type of simulation, one can use an appropriate random number generator (e.g. Poisson) to create a series of random numbers that represent the demand for an item in the interval between restocking cycles. The simulation then steps through this series of numbers and, at each step, takes the action that an actual replenishment system and stock clerk would have taken in the situation. Through this process one can simulate how many units of the item are on the shelf between restocking cycles. By comparing this to the random numbers that represent the demand, one can calculate the expected sales of the item, and then its profitability. To get more accurate results, one can run this simulation repeatedly and then average the results.

Consistently with the above discussion, the spreadsheet characterization of profit functions and cost functions shown in FIG. 1 can be generalized as illustrated by FIGS. 4 and 5. Analogously to the example shown in FIG. 1, FIG. 4 shows an exemplary solution to a generalized problem associated with an embodiment of the invention. For example, one generalized problem presents two attributes 508, 510 (Attribute 1 and Attribute 2) and a given a number of classes 500, 502, 504, 506 such that an embodiment of the invention selects exactly one choice per class such that:

1. The sum of Attribute 2 510 for all classes 500, 502, 504, 506 is a maximum or a minimum to meet an objective 512, for example, maximization of Attribute 2; and 2. The sum of Attribute 1 508 for all classes 500, 502, 504, 506 satisfies some constraint 514 such as $<, >, =, \geq,$ or $\leq$ a limit.

For example, using FIG. 4, and the constraint being Attribute 1 $\leq$ 10,500, the circled choices show the sum of Attribute 2 being maximized, wherein Attribute 2 is profit.

An embodiment of the optimization engine 128 then provides a solution to scenario-based retail problems, such as assortment planning and floor space allocation. The embodiment determines the most profitable answer for a given situation (e.g., potential items for the assortment) and its constraint (e.g., OTB ("Open To Buy") dollars or floor space). The present invention enables a simultaneous solution to the optimization problem and uses a comprehensive profit definition which may be based on a probability-based profit model. The invention also enables modeling the fluctuating nature of demand and selecting the assortment with optimal profit, for example, using OTB dollars as the constraint.

FIG. 5 shows other exemplary business problems that may be solved by an embodiment of the invention. For example, an embodiment solves a business problem that is associated with a main constraint 608, a class 602, and two attributes, Attribute 1 604 and Attribute 2 606. Attribute 2 606 may be, for example, item profit. An embodiment of the invention then creates a customized profit model 120 associated with the specific details of the business problem, FIG. 5 illustrates a number of possible embodiments tailored to specific business problems that may arise in a variety of business operations. The business problem may be associated with a dimensionally constrained assortment optimization 610, the main constraint may be total width, and the first attribute may be an item width. The business problem may be associated with a budget constrained assortment optimization 612, the main constraint may be associated with a total budget, and the first attribute may be an item cost. The business problem may be associated with advertising space allocation 618, the constraint may be associated with a total area of advertisement, and the first attribute may be an item advertisement area. The business problem may be associated with catalog space allocation 620, the constraint may be associated with a total area of catalog pages, and the first attribute may be an item advertisement area. The business problem may be associated with a start of season budget allocation 614, the constraint may be associated with a total budget available for merchandise, and the first attribute may be an item cost. The business problem may be associated with retail floor space optimization 616, the constraint may be associated with total floor space, and the first attribute may be item width. The business problem may be associated with loan portfolios 622, the constraint may be associated with a total loan budget, and the first attribute may be an item loan amount. The business problem may be associated with merchandise allocation to stores from a warehouse 624, the constraint may be associated with total units in the warehouse, and the first attribute may be units shipped to the stores.

3. Optimization Engines 3.1 MCKP Solvers

As discussed above with reference to FIG. 1, the optimization engine 128 determines the allocations by solving an MCKP, where the classical formulation is given as:

$$\text{maximize} \sum_{i=1}^{k} \sum_{j \in N_i} p_{ij} x_{ij} \tag{3-1}$$

$$\text{subject to} \sum_{i=1}^{k} \sum_{j \in N_i} w_{ij} x_{ij} \leq c$$

$$\sum_{j \in N_i} x_{ij} = 1 \quad i = 1, \ldots, k,$$

$$x_{ij} \in \{0, 1\}, \quad i = 1, \ldots, k, j \in N_i$$

In Eq. (3-1), k classes $N_1, \ldots N_k$ of items are given to pack into a knapsack of capacity (or cost) c. Each item $j \in N_i$ may have a corresponding profit $p_{ij}$ and a weight $w_{ij}$, and the problem is to choose one item from each class such that the profit sum is maximized subject to some constraint on the weight sum. Typically these parameters are assumed to be integers, but these assumptions can be relaxed for many optimization contexts (e.g., to include real-valued parameters) depending on the application setting as well as the solution method. Here it is generally assumed that the weight values $w_{ij}$ are non-negative and the capacity c value is also non-negative. The profit values $p_{ij}$ may be positive, negative or zero. These assumptions may also be relaxed under some conditions. (D. Pisinger and P. Toth, "Knapsack Problems", in *Handbook of Combinatorial Optimization*, vol. 1, D.-Z. Du and P. M. Pardalos, eds., Kluwer Academic Publishers, Drodrecht, 299-428, 1998.)

In (3-1) the constraint appears as a less-than-or-equal-to inequality so this variant may also be denoted as MCKPL. An alternative version of the problem denoted as MCKPE imposes the constraint as an equality constraint:

$$\text{maximize} \sum_{i=1}^{k} \sum_{j \in N_i} p_{ij} x_{ij} \tag{3-2}$$

-continued $$\text{subject to } \sum_{i=1}^{k} \sum_{j \in N_i} w_{ij} x_{ij} = c$$

$$\sum_{j \in N_i} x_{ij} = 1 \quad i = 1, \ldots, k,$$

$$x_{ij} \in \{0, 1\}, \quad i = 1, \ldots, k, j \in N_i$$

Additionally, a third alternative version of the problem denoted as MCKPG imposes the constraint as a greater-than-or-equal-to inequality:

$$\text{maximize } \sum_{i=1}^{k} \sum_{j \in N_i} p_{ij} x_{ij} \qquad (3\text{-}3)$$

$$\text{subject to } \sum_{i=1}^{k} \sum_{j \in N_i} w_{ij} x_{ij} \geq c$$

$$\sum_{j \in N_i} x_{ij} = 1 \quad i = 1, \ldots, k,$$

$$x_{ij} \in \{0, 1\}, \quad i = 1, \ldots, k, j \in N_i$$

In most operational settings the preferred formulation of MCKP is MCKPL, where the cost constraint appears as an upper bound (e.g., a hard budgetary or spatial limit). As an alternative formulation, MCKPE is sometimes preferred where all resources must be utilized or exhausted. And finally MCKPG may arise for example in cases where the cost appears as a lower threshold of utilization.

In an exemplary embodiment, the optimization engine 128 includes an MCKP solver to determine the solution 130 to the allocation problem defined by the profit functions 122, the cost functions 124 and the cost constraint 126. The MCKP formulations presented above fall into a larger class of problems known as integer programming problems, and a variety of solution techniques are possible including both exact and non-exact methods. (R. Fletcher, "Practical Methods of Optimization", 2nd edition, John Wiley and Sons, Chichester, 1987; R. G. Parker and R. L Rardin, *Discrete Optimization*, Academic Press, Boston, 1988.) In the context of discrete optimization, MCKP is NP-Hard as it contains KP (i.e., the Knapsack Problem) as a special case. Some methods exploit the particular structure of the MCKP formulation, particularly in the standard form given by Eq. (3-1). (D. Pisinger, "A Minimal Algorithm for the Multiple-Choice Knapsack Problem", European Journal of Operational Research (83) 2, pp 394-410, 1995; D. Pisinger and P. Toth, "Knapsack Problems", in *Handbook of Combinatorial Optimization*, vol. 1, D.-Z. Du and P. M. Pardalos, eds., Kluwer Academic Publishers, Drodrecht, 299-428, 1998)

The remaining subsections of this section present an embodiment of a method for solving MCKP based on dynamic programming to provide an exact solution in pseudo-polynomial time.

3.2 Exact Solution of MCKPE

This subsection presents a dynamic programming method for providing the optimal solution to MCKPE. Also techniques for finding the optimal solution vector are discussed.

The next subsection (3.3) presents improvements to the dynamic programming algorithm; for example, space consumption may be reduced from O(nc) to O(c) at almost no cost in the solution time. Also several techniques are presented for decreasing the constants in the running time O(nc). The next subsection (3.4) shows how other variants of the problem may be addressed, including solving MCKPL and MCKPG by means of the method for solving MCKPE. The next subsection (3.5) shows computation results that illustrate the practical performance of the method and summarizes some of its advantages.

Since MCKPE is NP-hard, exact solution methods generally must rely on some enumeration techniques, where dynamic programming is generally preferred since it gives a tight bound on running time. In the method shown here, dynamic programming is used to solve MCKPE directly.

First it is shown that MCKPE has an optimal substructure property, in which an optimal solution consists of optimal subsolutions. That is, if $\hat{x}^{(k)} = \{\hat{x}_{ij}\}_{i=1,\ldots,k, j \in N_i}$ is an optimal solution to MCKPE, then the subsolution $x^{(h)} = \{\hat{x}_{ij}\}_{i=1,\ldots,h, j \in N_i}$ for any h=0, . . . , k is an optimal solution to the restricted MCKPE problem defined on the classes 1, . . . , h and with capacity $$c' = c - \sum_{i=h+1}^{k} \sum_{j \in N_i} w_{ij} \hat{x}_{ij}^{(k)}$$

The proof is by contradiction. Assume that $x^{(k)} = \{\hat{x}_{ij}\}_{i=1,\ldots,k, j \in N_i}$ is an optimal solution to MCKPE, but that the subsolution $\hat{x}^{(h)} = \{\hat{x}_{ij}\}_{i=1,\ldots,h, j \in N_i}$ for any h=0, . . . , k is not an optimal solution to the problem $$\text{maximize } \sum_{i=1}^{h} \sum_{j \in N_i} p_{ij} x_{ij} \qquad (3\text{-}4)$$

$$\text{subject to } \sum_{i=1}^{k} \sum_{j \in N_i} w_{ij} x_{ij} = c$$

$$\sum_{j \in N_i} x_{ij} = 1 \quad i = 1, \ldots, k,$$

$$x_{ij} \in \{0, 1\}, \quad i = 1, \ldots, k, j \in N_i$$

Then, there must exist a solution $\bar{x}^{(h)} = \{\bar{x}_{ij}\}_{i=1,\ldots,h} j \in N_i$, to (3-4) that yields a better solution value. By setting $\bar{x}_{ij} = \hat{x}_{ij}$ for i=h+1, . . . , k j∈$N_i$, one has constructed a complete solution $\bar{x}^{(k)}$ to MCKPE. This solution $\bar{x}^{(h)}$ is feasible, since in comparison to $\hat{x}^{(k)}$ that was a feasible solution, different items in classes 1, . . . , h may be chosen that had an identical weight sum. Moreover, this solution $\bar{x}^{(k)}$ will have a better objective value than $\hat{x}^{(k)}$ since a subset of the solution $\hat{x}^{(k)}$ is replaced with items that have a larger profit sum. This contradicts the original assumption that $\hat{x}^{(k)}$ is an optimal solution to MCKPE and proves the result.

Knowing the property of optimal substructure, one can derive a dynamic programming algorithm. Let f(h, d) be an optimal solution to the MCKPE problem defined on classes 1, . . . , h with capacity d, i.e.

$$f(h,d) = \begin{cases} \text{maximize} & \sum_{i=1}^{h} \sum_{j \in N_i} p_{ij} x_{ij} \\ \text{subject to} & \sum_{i=1}^{k} \sum_{j \in N_i} w_{ij} x_{ij} = d \\ & \sum_{j \in N_i} x_{ij} = 1 \quad i = 1, \ldots, h \\ & x_{ij} \in \{0, 1\}, \quad i = 1, \ldots, k, j \in N_i. \end{cases} \quad (3\text{-}5)$$

With the assumption that $f(h, d) = -\infty$ if no solution exists to (3-5), one obtains the following recursion:

$$f(h, d) = \qquad (3\text{-}6)$$
$$\max_{j \in N_h}(f(h-1, d - w_{hj}) + p_{hj}) \text{ for } h = 1, \ldots, k, d = 0, \ldots, c$$

where it is assumed that the expression inside the parenthesis returns $-\infty$ if $d - w_{hj} < 0$. For $h=0$ there is only one possible solution to (3-5), namely, $f(0, 0)=0$. For all other capacities $d=0, \ldots, c$, one sets $f(0, d) = -\infty$ so as to indicate that no solution exists.

Thus to solve MCKPE, the recursion (3-6) may be used to fill a table $f(h, d)$ of dimensions $(k+1) \times (c+1)$. Since each evaluation of (3-6) takes $O(n_h)$ time, one obtains the time complexity $O(c \Sigma_{i=0}^{k} n_i) = O(cn)$. The space complexity is $O(kc)$ due to the dimension of table f. The optimal solution value may be found as $z = f(k, c)$, where a value of $-\infty$ indicates that the weight sum c cannot be obtained by any combination of items from the classes. Not only is the optimal solution for capacity c obtained, but in addition, the table $f(k, \cdot)$ contains all optimal solutions for capacities $0, \ldots, c$.

The recursion (3-6) determines the optimal solution value for all capacities $0, \ldots, c$ but it does not give any information about the corresponding solution vector. But having the table $f(h, d)$ permits one to use backtracking techniques to determine the latter. Thus it is possible to determine the solution vector for capacity c, i.e. the vector corresponding to $f(k, c)$. To find out which item was chosen from the last class it, the following equation is tested:

$$f(k-1, c - w_{kj}) + p_{kj} = f(k, c) \qquad (3\text{-}7)$$

for all values of $j \in N_k$. The equality must be satisfied for some value of $j \in N_k$ since $f(k, c)$ was obtained by performing the reverse operation in (3-6). Assume that j' is the proper item. Then, $x_{kj'} = 1$, and that all other values of $x_{kj}$ should be set to 0. Moreover, let $d = c - w_{kj'}$ be the new capacity. Then the same process may be repeated in a recursive way, now looking at class $k-1$ with capacity d.

The running time of the algorithm is $O(n)$ because for each class $h = k, \ldots, 1$ equation (3-7) is tested for all $j \in N_i$ thus taking time $O(\Sigma_{h=1}^{k} n_i) = O(n)$. According to this approach, however, the entire table $f(h, d)$ is stored to derive the optimal solution vectors.

3.3 Improved Dynamic Programming Algorithm

Although recursion (3-6) may be used in its straightforward form, the complexity may become excessive for problems with many classes and/or large capacities. In particular the space complexity may quickly become a bottleneck when capacities are large (e.g. $c = 1\,000\,000$). Several techniques improve space and time consumption of the method, as follows:

All calculations can be made within a single array of length $c+1$.

The solution vector may be derived in a very space-efficient way.

Only values of $f(h, d)$ for specific values of it need to be evaluated in recursion (3-6).

Sorting of classes according to their weight span may improve the practical performance.

Dominance in classes removes items that will not lead to an optimal solution.

Loop unrolling may be used to improve caching.

(a) Space Reduction

A variant of the method reduces the requirements for space. In terms of space reduction, because the recursion (3-6) derives entries $f(h, \cdot)$ from $f(h-1, \cdot)$ there is only a need to store the two most recently considered columns of the table, thus decreasing the space complexity to $2(c+1)$.

To decrease the space consumption further, in order to evaluate $f(h, d)$, an alternative method only addresses the table for capacities it $d - w_{hj} \leq d$. For example, in recursion (3-6) to determine $f(h, d)$ for decreasing values of the capacity $d = c, c-1, \ldots, 0$, only a single table of length $c+1$ is needed because the table $f(d)$ for a given value of it holds entries $f(h-1, d)$ for $d = 0, \ldots, d'$ and values $f(h, d)$ for $d = d'+1, \ldots, c$. In other words, the recursion is evaluated in-place, which provides minimal space consumption. Although only a single table is necessary for storing $f(h, d)$, the table is still written with two arguments, where the first index refers to the current stage of the evaluation as defined by (3-5).

(b) Finding the Solution Vector in a Space-efficient Way

A variant of the method finds the solution vector in a space-efficient way. After reducing the space consumption to a single table of length $c+1$, finding the solution vector in a straight-forward manner is desirable. It is then possible to re-compute the solution vector by solving a number of MCKPE problems. (U. Pferschy, "Dynamic Programming Revisited: Improving Knapsack Algorithms", *Computing*, 63, pp 419-430, 1999.) For example, assume that for a given capacity c one has found the optimal solution z to (3-2). If one knows the weight sum d of the optimal solution when class $i = \lfloor k/2 \rfloor$ was considered in recursion (3-6), then one is a step closer to finding the solution vector. Knowing the weight sum of the optimal solution at the "mid-point" of the algorithm, one can split the original problem into two problems, the first being defined on the first $\lfloor k/2 \rfloor$ classes of the problem, the latter problem being defined on the remaining classes of the problem:

$$\text{maximize} \sum_{i=1}^{\lfloor k/2 \rfloor} \sum_{j \in N_i} p_{ij} x_{ij} \qquad (3\text{-}8)$$

$$\text{subject to} \sum_{i=1}^{k} \sum_{j \in N_i} w_{ij} x_{ij} = d$$

$$\sum_{j \in N_i} x_{ij} = 1 \quad i = 1, \ldots, k,$$

$$x_{ij} \in \{0, 1\}, \quad i = 1, \ldots, k, j \in N_i$$

and $$\text{maximize} \sum_{i=\lfloor k/2 \rfloor+1}^{h} \sum_{j \in N_i} p_{ij} x_{ij} \quad (3\text{-}9)$$

$$\text{subject to} \sum_{i=1}^{k} \sum_{j \in N_i} w_{ij} x_{ij} = c - d$$

$$\sum_{j \in N_i} x_{ij} = 1 \quad i = 1, \ldots, k,$$

$$x_{ij} \in \{0, 1\}, \quad i = 1, \ldots, k, \; j \in N_i$$

If one repeats this process recursively, a number of problems are obtained considering only a single class, and it becomes easy to determine the optimal solution vector of a MCKPE defined on a single class.

This approach therefore solves $1+2+4+\ldots+2^{\log_2 k}=1+2+4+\ldots+2k \leq 4k$ problems. Because the capacity of the problems is decreasing, the time complexity becomes the following: The first problem takes $O(nc)$ time to solve. The following two subproblems take $O((n/2)d)$ and $O((n/2)(c-d))$ time respectively, which in total takes $O(nc/2)$ time. Using the same observation, the next four subproblems take $O(nc/4)$ time to solve, and in total the following time complexity is obtained:

$$nc + \frac{nc}{2} + \frac{nc}{4} + \frac{nc}{8} + \ldots = nc\left(1 + \frac{1}{2} + \frac{1}{4} + \frac{1}{8} + \ldots\right) \leq 2nc \quad (3\text{-}10)$$

Thus, to derive the optimal solution vector this approach uses twice the time needed to find only the optimal solution value.

It is however not obvious to see how one keeps track on the weight sum d of the optimal solution when class $i=\lfloor k/2 \rfloor$ was considered in recursion (3-6). For this reason an auxiliary table $g(h, d)$ is introduced, which for $h \geq \lfloor k/2 \rfloor$ holds the weight sum of the solution $f(h, d)$ when the class $i=\lfloor k/2 \rfloor$ is considered. In other words one extends recursion (3-6) to the following. For $i < \lfloor k/2 \rfloor$ one just sets $g(h, d)$ to any value, e.g. zero. For $h=\lfloor k/2 \rfloor$ one has the recursion $$f(h,d)=f(h-1,d-w_{hj'})+p_{hj'}$$

$$g(h,d)=d$$

$$j'=\arg\max_{j \in N_h} f(h-1, d-w_{hj'})+p_{hj'} \quad (3\text{-}11)$$

For $h > \lfloor k/2 \rfloor$ one has $$f(h,d)=f(h-1,d-w_{hj'})+p_{hj'}$$

$$g(h,d)=g(h-1,d-w_{hj'})$$

$$j'=\arg\max_{j \in N_h} f(h-1, d-w_{hj'})+p_{hj'} \quad (3\text{-}12)$$

This recursion ensures that $g(k, c)$ holds the weight sum of the optimal solution when class $i=\lfloor k/2 \rfloor$ is considered.

As noted in the previous section, it is not necessary to save the whole table $g(h, it)$ but only to store a single table of length $c+1$.

(c) Evaluating the Recursion for a Limited Range of Capacities

The recursion (3-6) should be evaluated for all values of $h=1, \ldots, k$ and $d=0, \ldots, c$ but actually it is not necessary to consider all capacities. Let for each class $i=1, \ldots, k$ the minimum and maximum weight in the class be given as $$\underline{w}_i = \min_{j \in N_i} w_{ij} \quad \overline{w}_i = \max_{j \in N_i} w_{ij} \quad (3\text{-}13)$$

Then at stage h of recursion (3-6) the weight sum d cannot be obtained if $$0 \leq d < \sum_{i=1,\ldots,h} \underline{w}_i \quad (3\text{-}14)$$

or $$\sum_{i=1,\ldots,h} \overline{w}_i < d \leq c \quad (3\text{-}15)$$

so that one sets $f(h, d) = -\infty$ for these values of d. Thus the recursion only needs to be evaluated for the remaining capacity values d in the interval $$\sum_{i=1,\ldots,h} \underline{w}_i \leq d \leq \min\left\{\sum_{i=1,\ldots,h} \overline{w}_i, c\right\} \quad (3\text{-}16)$$

Although this does not change the worst-case time complexity of $O(nc)$ it can reduce the solution times for many practical instances.

If one wishes to solve the MCKPE problem only for the capacity c (this occurs e.g. when we are looking for the solution vector corresponding to the optimal solution), even fewer capacities need to be considered in the recursion. In this case, at stage h, one does not need to consider capacities d which cannot reach the capacity c even if one chooses the heaviest items in all the remaining classes $i=h+1, \ldots, k$ it. Thus one need only consider capacities where $$d + \sum_{i=h+1}^{k} \overline{w}_i \geq c \quad (3\text{-}17)$$

which reduces the considered capacities d to $$\max\left\{\sum_{i=1,\ldots,h} \underline{w}_i, c - \sum_{i=h+1}^{k} \overline{w}_i\right\} \leq d \leq \min\left\{\sum_{i=1,\ldots,h} \overline{w}_i, c\right\} \quad (3\text{-}18)$$

(d) Preordering of classes

As we saw in the previous section, it was only necessary to evaluate recursion (3-6) for specific values of the capacity d. In order to get the largest benefit of this optimization, one should order the classes according to increasing values of the weight span $s_i$ which for class i is defined as $$s_i = \overline{w}_i - \underline{w}_i \quad (3\text{-}19)$$

A motivation for sorting the classes according to increasing $s_i$ is to limit as long as possible the range of capacities that need to be considered in (3-6). A simple example may illustrate this approach

EXAMPLE 1

Assume that one has three classes given as $$N_1=\{(0,0),(9,9)\}, N_2=\{(0,0),(3,3),(5,5)\}, N_3=\{(0,0),(1,1)\}, c=15 \quad (3\text{-}20)$$

If one treats the classes as given, one will consider the capacities 0, ..., 9 in the first iteration, capacities 0, ..., 14 in the second, and capacities 0, ..., 15 in the third iteration. This will in total demand 41 evaluations of (3-6). The weight spans are 9, 5 and 1 respectively, so if one treats the classes in reverse order, one will need to consider capacities 0, ..., 1 in the first iteration, capacities 0, ..., 6 in the second, and capacities 0, ..., 15 in the third iteration. This will in total demand 25 evaluations of (3-6).

(e) Dominance of items

A variant of the method uses dominance within each class to remove some of the items a-priori, thus improving the solution time of the algorithm.

Definition 1 Assume that one is solving the MCKPE problem. If two items r and s in the same class $N_i$ satisfy that $$w_{ir}=w_{is} \text{ and } p_{ir} \geq p_{is} \quad (3\text{-}21)$$

then one says that item r dominates item s.

Obviously an optimal solution exists where no dominated items occur: Assume that an optimal solution used item s from class $N_i$ which is dominated by item r. Then by choosing item r instead of item s one obtains a solution with the same weight sum, and a not smaller profit sum. Thus one may delete dominated items from each class before running recursion (3-6).

For the MCKPL variant of the problem, a stronger concept of dominance can be used:

Definition 2 Assume that one is solving the MCKPL problem. If two items r and s in the same class Ni satisfy that $$w_{ir} \leq w_{is} \text{ and } p_{ir} \geq p_{is} \quad (3\text{-}22)$$

then one says that item r dominates item s.

Obviously an optimal solution to MCKPL exists where no dominated items occur, and thus one may a-priori delete these items.

Finally for the MCKPG variant of the problem, one uses the following concept of dominance.

Definition 3 Assume that one is solving the MCKPG problem. If two items r and s in the same class $N_i$ satisfy that $$w_{ir} \geq w_{is} \text{ and } p_{ir} \geq p_{is} \quad (3\text{-}23)$$

then one says that item r dominates item s.

Since an optimal solution to MCKPG exists where no dominated items occur, one may delete all dominated items a-priori.

(f) Loop unrolling

The recursion (3-6) is easy to implement but it may be quite time-consuming to evaluate on modern processors, since it does not utilize caching very well. The problem is, that in order to evaluate f(d) it may be necessary to make several look-ups in the table f at positions $f(d-w_{hj})$ for $j \in N_h$. Since the values $w_{hj}$ may be scattered the caching strategy of the processor will not work very well.

As a rule of thumb the cache ensures that whenever one makes a look-up in table f at position d then also the value of f at positions around d will be available. To use this fact, it may be appropriate to evaluate several values of f(d) at the same time. Thus in recursion (3-6) we determine $$f(h,d), f(h,d+1), \ldots, f(h,d+M-1) \quad (3\text{-}24)$$

at the same time for a reasonable value of M, (e.g. 16). Initially one sets all $$f(h,d+i)=-\infty \text{ for } i=0,\ldots,M-1 \quad (3\text{-}25)$$

Then one runs through the values $j \in N_h$ one by one, setting $$f(h,d+1)\max\{f(h,d+i), f(h-1,d+i-w_{hj}+p_{hj})\} \quad (3\text{-}26)$$

As seen this means that the values $w_{hj}$ and $p_{hj}$ can be stored locally, since they are used in a number of calculations, and that the table f is addressed in a linear way. The values f(h, d+i) should be stored locally to improve performance (and to ensure correctness of the algorithm).

3.4 The MCKP With Different Capacity Constraints

Having solved MCKPE to optimality for all capacities d=0, ..., c it is not difficult to solve MCKPL. One simply sets $$f(k,d) = \max_{d'=0,\ldots,d} f(k,d') \text{ for } d=0,\ldots,c \quad (3\text{-}27)$$

which can be done in time O(c) if one considers the capacities it in increasing order, since then one has $$f(k,d)=\max\{f(k,d-1), f(k,d)\} \quad (3\text{-}28)$$

for d=1, ..., c.

To find the solution vector corresponding to the optimal solution value of MCKPL, it is necessary to determine for which capacity d* the largest profit sum is obtained. This can be done by keeping track on the most promising value of d* as part of (3-28). The optimal solution vector is then found as for MCKPE, where d* is the capacity.

In a similar way one may also solve the MCKPG problem. It is necessary however to demand that the maximum capacity c used in recursion (3-6) is at least as large as the maximum obtainable weight sum. If this is the case then the table f(k, d) holds the optimal solution value of MCKPE for all obtainable weight sums d. In this case one may set $$f(k,d) = \max_{d'=d,\ldots,c} f(k,d') \text{ for } d=0,\ldots,c \quad (3\text{-}29)$$

which can be evaluated efficiently by considering the capacities d in decreasing order setting $$f(k,d)=\max\{f(k,d), f(k,d+1)\} \quad (3\text{-}30)$$

for d=c-1, ..., d.

In view of the requirement that c is larger than the total weight sum obtainable, the solution vector for MCKPG will correspond to the best solution value obtainable for this value of c. The arguments to the algorithm do not make it possible to find a solution vector for a smaller value of c.

3.5 Computational Experiments and Summary

The worst-case solution time of the method presented above is O(nc) where n is the total number of items, and c the maximum capacity for which the solution should be derived. To evaluate the practical performance of the algorithm and to uncover the constants involved in the term O(nc), a number of test instances with varying problem size and data-range were executed. Three types of randomly generated data instances were considered, for a different number of classes k and size $n_i$. The data-range R is a constant stating the magnitude of the parameters generated.

Uncorrelated data instances (UC): In each class we generate $n_i$ items by choosing $w_{ij}$ and $p_{ij}$ randomly in [1, R].

Weakly correlated data instances (WC): In each class, $w_{ij}$ is randomly distributed in [1, R] and $p_{ij}$ is randomly distributed in [$w_{ij}$−10, $w_{ij}$+10], such that $p_{ij}$>1.

Subset-sum data instances (SS): $w_{ij}$ randomly distributed in [1, R] and $p_{ij}$=$w_{ij}$ The currently biggest practical problems solved have 500 classes with 10 items per class, so a number of experiments with instances similar to this configuration were run testing varying data-range R and capacity c. The solution times are reported for tests run on a Intel Pentium 11 550 MHz computer with 64 Mb RAM. The internal space consumption of the algorithm is 12n+8c bytes, where it is assumed that a long integer takes 4 bytes (the return array for the histogram is not counted as part of the internal space consumption, but it takes Cc bytes). Thus for the largest instance considered in this Section, having k=500, $n_i$=20 and c=1000000 the space consumption was 12*10000+8*1000000=8120000 bytes, a reasonable space consumption.

Tables 1 to 4 report the solution times for capacities c=10000, 100000 and 1000000, class sizes $n_i$=5, 10 and 20, data-range R=100, 1000 and 10000.

Tables 1 and 2 report the running times for deriving the histogram of all optimal solution for capacities 0, . . . , c. The first table is for the MCKPE problem, the second table is for the MCKPL problem. It is seen that most of the solution times, as indicated in seconds, are very reasonable, making the algorithm applicable for interactive planning even for large instances.

TABLE 1

Running times for finding histogram to MCKPE, with an average of 10 instances.

| k | $n_i$ | R | c | UC | WC | SS |
|---|---|---|---|---|---|---|
| 500 | 5 | 100 | 10000 | 0.1 | 0.1 | 0.1 |
| 500 | 5 | 1000 | 100000 | 1.1 | 1.1 | 1.1 |
| 500 | 5 | 10000 | 1000000 | 12.9 | 12.9 | 12.3 |
| 500 | 10 | 100 | 10000 | 0.4 | 0.4 | 0.4 |
| 500 | 10 | 1000 | 100000 | 4.2 | 4.3 | 4.2 |
| 500 | 10 | 10000 | 1000000 | 45.3 | 45.2 | 44.1 |
| 500 | 20 | 100 | 10000 | 0.9 | 0.9 | 0.8 |
| 500 | 20 | 1000 | 100000 | 9.3 | 9.2 | 8.6 |
| 500 | 20 | 10000 | 1000000 | 98.1 | 97.3 | 90.6 |

TABLE 2

Running times for finding histogram to MCKPL, with an average of 10 instances.

| k | $n_i$ | R | c | UC | WC | SS |
|---|---|---|---|---|---|---|
| 500 | 5 | 100 | 10000 | 0.1 | 0.1 | 0.1 |
| 500 | 5 | 1000 | 100000 | 0.7 | 1.1 | 1.1 |
| 500 | 5 | 10000 | 1000000 | 8.6 | 12.9 | 12.3 |
| 500 | 10 | 100 | 10000 | 0.2 | 0.3 | 0.4 |
| 500 | 10 | 1000 | 100000 | 1.6 | 4.2 | 4.2 |
| 500 | 10 | 10000 | 1000000 | 17.0 | 45.1 | 44.1 |
| 500 | 20 | 100 | 10000 | 0.2 | 0.6 | 0.8 |
| 500 | 20 | 1000 | 100000 | 2.4 | 8.8 | 8.6 |
| 500 | 20 | 10000 | 1000000 | 24.1 | 96.7 | 90.7 |

TABLE 3

Running times for finding optimal solution to MCKPE, with an average of 10 instances.

| k | $n_i$ | R | c | UC | WC | SS |
|---|---|---|---|---|---|---|
| 500 | 5 | 100 | 10000 | 0.2 | 0.2 | 0.2 |
| 500 | 5 | 1000 | 100000 | 2.7 | 2.7 | 2.4 |
| 500 | 5 | 10000 | 1000000 | 32.5 | 32.4 | 27.5 |
| 500 | 10 | 100 | 10000 | 0.8 | 0.8 | 0.7 |
| 500 | 10 | 1000 | 100000 | 8.9 | 8.9 | 6.9 |
| 500 | 10 | 10000 | 1000000 | 98.2 | 97.3 | 74.0 |
| 500 | 20 | 100 | 10000 | 1.8 | 1.8 | 1.3 |
| 500 | 20 | 1000 | 100000 | 18.4 | 18.3 | 12.8 |
| 500 | 20 | 10000 | 1000000 | 199.7 | 197.1 | 137.3 |

TABLE 4

Running times for finding optimal solution to MCKPL, with an average of 10 instances.

| k | $n_i$ | R | c | UC | WC | SS |
|---|---|---|---|---|---|---|
| 500 | 5 | 100 | 10000 | 1.8 | 2.7 | 2.5 |
| 500 | 5 | 10000 | 1000000 | 22.6 | 33.1 | 29.1 |
| 500 | 10 | 100 | 10000 | 0.4 | 0.7 | 0.8 |
| 500 | 10 | 1000 | 100000 | 3.9 | 9.3 | 8.3 |
| 500 | 10 | 10000 | 1000000 | 43.9 | 103.6 | 89.0 |
| 500 | 20 | 100 | 10000 | 0.6 | 1.4 | 1.6 |
| 500 | 20 | 1000 | 100000 | 5.7 | 19.1 | 16.5 |
| 500 | 20 | 10000 | 1000000 | 61.3 | 214.8 | 176.2 |

Tables 3 and 4 report the running times for deriving the optimal solution vector corresponding to the capacity c. Table 3 considers the MCKPE variant of the problem, and Table 4 considers the MCKPL variant. In an embodiment, it takes about twice as long to find the optimal solution vector than to find the histogram. This corresponds well to the observation of equation (3-10). Any dynamic programming algorithm can have some overhead for finding the corresponding solution vector.

An exemplary algorithm for the Multiple-choice knapsack problem has been presented above. The algorithm can vary by allowing the user to specify different relations in the capacity constraint, and by solving the problem for all capacities 0, . . . , c. The latter property makes the algorithm very applicable for interactive decision making, since it gives the decision maker a complete overview over the problem.

Compared to simple dynamic programming recursion the improved algorithm decreases the practical solution times by a factor 5-20. Moreover, the space consumption has been decreased from O(nc) to O(c) at the cost of a small increase in the solution time. Without this latter improvement, it would not have been possible to solve certain large problems. A straightforward use of recursion equation (3-6) for the instance with n=10 000 and c=1000 000 would have demanded approximately 40 Gb processing space. Instead, the algorithm can be run using, for example, only 8 Mb processing space. A final benefit of the algorithm is that it can be adapted for thorough error handling which should make it very robust against break-downs inside the corresponding code.

4. Additional Embodiments

Figure 6:
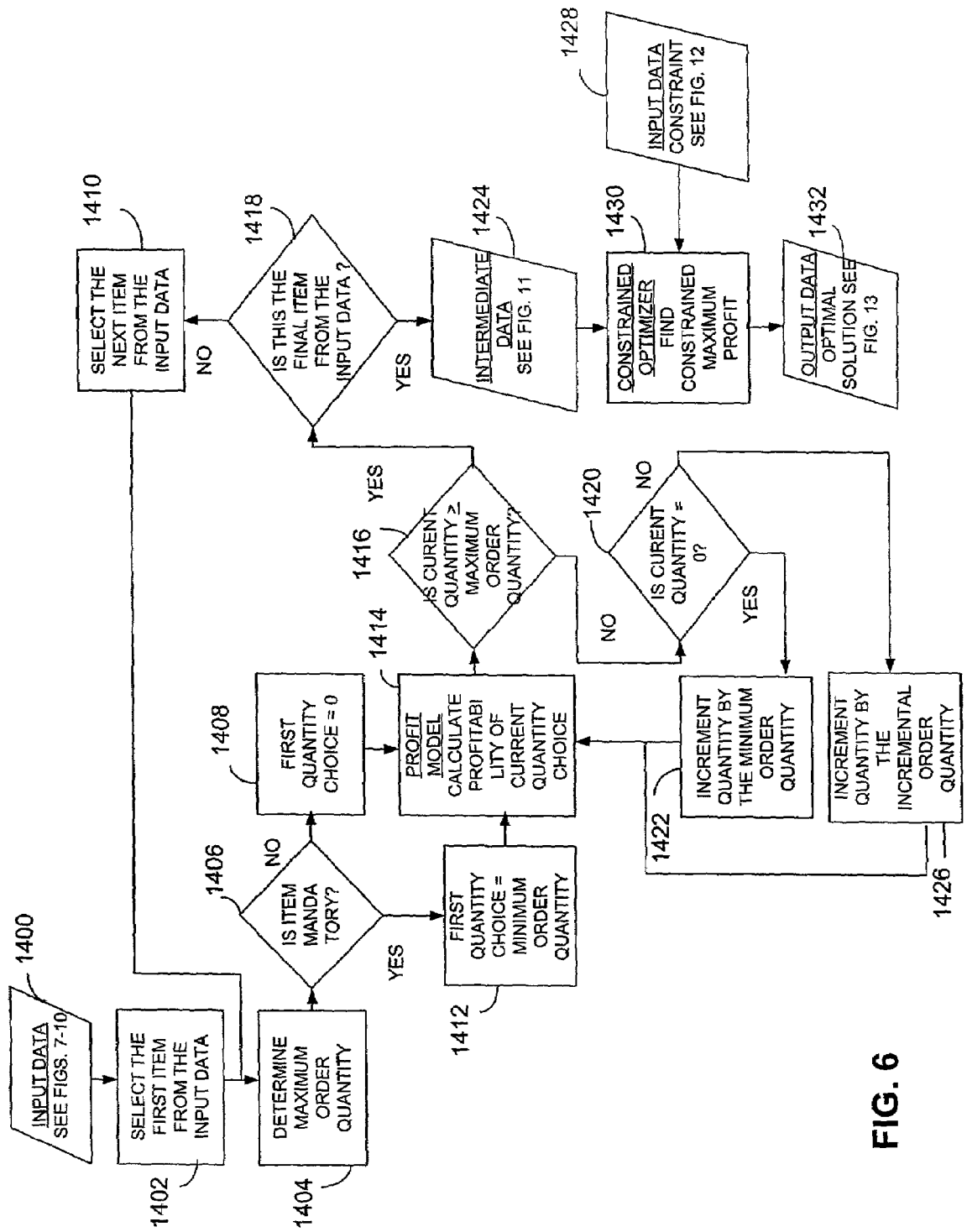
FIG. 6 shows an exemplary flowchart of an assortment optimization embodiment of the invention.
Figure 12:
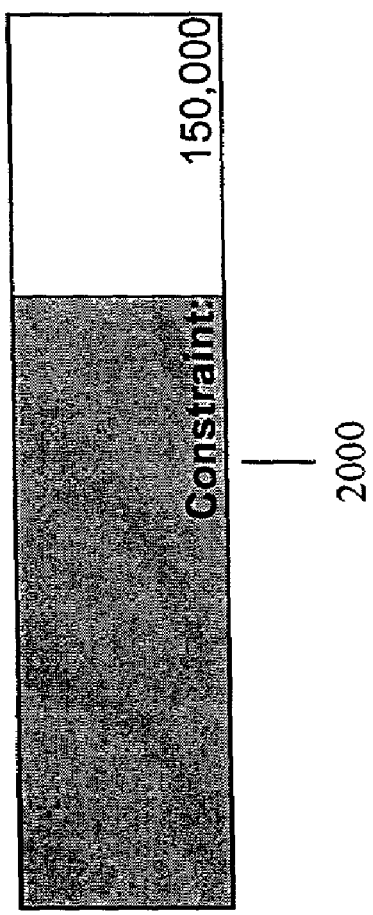
FIG. 12 shows an exemplary constraint table associated with an embodiment of the invention.

FIG. 6 shows an exemplary flowchart of an assortment optimization embodiment of the invention, showing further detail than the embodiment shown in FIG. 2. This embodiment is capable of solving either physically constrained problems, such as determining the optimal number of facings of each item to include in a fixed amount of shelf width, or economically constrained problems, such as the way in which a buyer of fashion items can optimally allocate their spending budget among a set of candidate fashion items. The sample data and calculations that appear in FIGS. 7-13 illustrate the use of this embodiment in its economically constrained mode only. For this embodiment, values for the profit data are read from the tables shown in FIGS. 7-10, the profit functions and cost functions are shown in FIG. 11, the cost constraint is shown in FIG. 12, and solution values for the allocations are shown in FIG. 13. In step 1400, data is input, including from an item attribute table, an item demand table, a system attributes table, and a season attributes table, such as the exemplary tables shown in FIGS. 7-10. In step 1402, the optimizer selects the first item from the input data and determines the maximum order quantity in step 1404.

In step 1406, the optimizer determines whether the item is mandatory. If it is mandatory, step 1412 sets the first quantity choice equal to the minimum order quantity. If the item is not mandatory, at step 1408, the first quantity choice is set to 0. The profit model in this exemplary embodiment uses a simulation to calculate the profitability for any given amount of an item that the buyer purchases from the manufacturer. The profit, in this example, is the gross profit, which is defined as the difference between the sales income and the inventory cost (cf. Eq. (2-1)).

In step 1414, the profit model is used to calculate the profitability of current quantity choices. At step 1416, if the current quantity is greater than or equal to the maximum order quantity, step 1418 checks whether this is the final item from the input data. If it is not the final item, the next item is selected in step 1410, and the maximum order quantity is determined in step 1404. At step 1416, if the current quantity is not greater than or equal to the maximum order quantity, then at step 1420, the optimizer checks to determine if the current quantity for the item is 0. If the current quantity is 0, then at step 1422, the quantity is incremented by the minimum order quantity.

At step 1420, if the current quantity is not 0, then the optimizer increments the quantity by the incremental order quantity at step 1426. After the incrementation in step 1422 or step 1426, the data is passed back to the profit model at step 1414 to determine profitability of the current quantity choice.

At step 1418, if the final item profitability has been calculated, then at step 1424, the intermediate data, such as the data in the exemplary table shown in FIG. 11, is generated. At step 1430, the optimizer takes the constraint data from step 1428, such as the exemplary constraint shown in the table in FIG. 12, and finds the maximum constrained profit.

At step 1432, the output data showing the optimal solution generated by the optimizer is communicated to, for example, a display. An exemplary output table is shown in FIG. 13.

As discussed above, values for the profit data are read from the tables shown in FIGS. 7-10. FIG. 7 shows an exemplary item attribute table 1500 associated with this embodiment of the invention. Exemplary include field 1502 value of "1" indicates that the item should be included in the optimization. Otherwise "0" is entered. Item ID 1504 is an Item identifier. Item Description 1506 includes a text description of the item. Item Type 1508 "F" or "f" indicates a fashion item, and "R" or "r" indicates a replenishment item. Total Lifecycle 1510 indicates the number of weeks the item is expected to be selling in the stores, along with the weeks between the in-store date and the out-of-stock date.

Cost 1512 indicates the unit cost of the associated item. Width 1514 indicates the item width for the item. In an embodiment, if the item is apparel, a numeric placeholder such as "1" can be entered. Height 1516 indicates an item height, with a numeric placeholder entered for apparel. Capacity 1518 indicates facing capacity, or the number of units that fit on a shelf. A numeric placeholder may also be entered for capacity.

Mandatory 1520 may contain True ("T" or "t") to indicate that the item must be part of the assortment, or False ("F" or "f") to indicate that the item is optional. For Estimate Type 1522, "D" or "d" can indicate that the estimate entered in the Item Demand text file is a representation of demand rather than historical sales.

Resupply factor 1524 is a sample field for which a placeholder may be used. MOQ 1526 indicates minimum order quantity, such as the minimum number of units that must be bought if the item is included in the assortment. The MOQ 1526 may be determined by factors such as vendor requirements, fixture fill quantities, and other factors. The MOQ 1526 may be 0 if there is no minimum requirement.

Incr Order Qty 1528 indicates that above the MOQ 1526, buy quantities must be in increments of the number of units entered. Case packs or number of stores may be factors in determining this number. If buys may be placed for any number of units, 1 can be entered.

Min Shelf Presence 1530 indicates the number of units on the floor that will trigger the replenishment system to place an order. A numeric placeholder can be entered for fashion items. Holding Cost 1532 indicates, for example, the cost per unit per week of holding inventory in a warehouse or backroom.

Vendor Lead Time 1534 indicates a number of weeks from the point the replenishment system orders an item until the item reaches the store floor. Start Sell Date 1536 indicates the date the item will be on the floor in a significant number of stores. Nbr Of Stores 1538 indicates the number of stores that will carry the item. Pack Size 1540 indicates, for example, the number units shipped in one factory pack.

FIG. 8 shows an exemplary item demand and price table 1600 associated with this embodiment of the invention. Item ID 1504 indicates the item identifier. In an exemplary embodiment, Entry-Type 1602 may include one, of three parameters for each item:

DEMAND—Specifies that the "Week" column contains the regular (not promotional) demand.

PROMO—Specifies that the "Week" column contains the demand that occurs during a promotional period.

PRICE—Specifies that the "Week" column contains the unit price.

Nbr. Of Entries 1604 specifies the number of "Week" columns that will be defined. This field allows the user to define profiles in which regular demand, promotional demand, and price fluctuate over time. In this example, a "1" indicates that average demand and price are constant over the life cycle of the item.

Week 1 1606 indicates the value of Entry Type 1602 during week 1. Week 2 indicates the value of Entry Type 1602 during week 2. Week 3 1610 represents the value of Entry Type 1602 during week 3. In this example a half-year life cycle is used, ending at Week 26 1612, which shows the value of Entry Type 1602 during week 26.

FIG. 9 shows an exemplary system attribute table 1700 associated with this embodiment of the invention. Periods of Supply 1702 indicates the target weeks of supply to maintain in the stores. Periods per Window 1704 indicates the number of weeks that comprise the sliding of the window used to determine average demand.

Number of Simulation Trials 1706 indicates the number of simulations the profit model will run. Higher numbers should lead to smaller margins of error, but longer run times.

Interest Rate 1708 indicates the interest rate the company could attain if the money invested in the assortment is invested elsewhere. Date the Buys Will be Placed 1710 indicates the date to which the present value of money will be calculated. Operating Hours per Period 1712 indicates the number of hours that the store is open for business in one time period.

Stock Clerk Success Rate 1714 indicates the probability that a stock clerk will replenish an item when the on-shelf supply of the item is depleted to the trigger value. Stock Clerk Cycle Time 1716 indicates the elapsed time between the stock clerk's visits to the item location. Stock Clerk Trigger Value 1718 indicates that if the stock clerk finds this number of units of an item on the shelf, the clerk should attempt to replenish the shelf.

Figure 10:
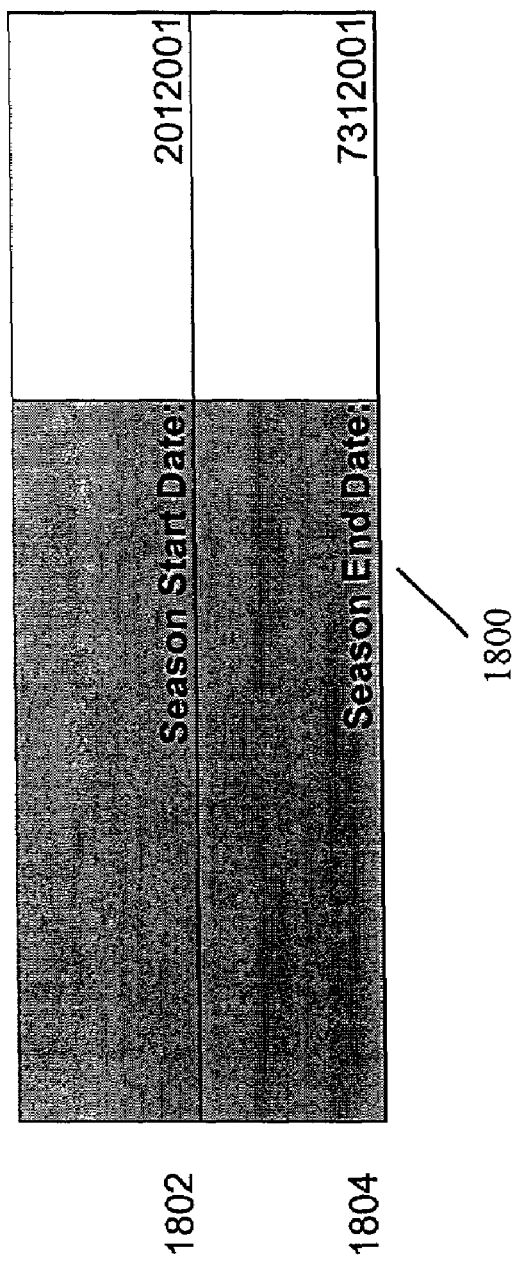
FIG. 10 shows an exemplary season attributes table associated with an embodiment of the invention.

FIG. 10 shows an exemplary season attributes table 1800 associated with this embodiment of the invention. Season Start Date 1802 represents the start of the time for which the buyer is selecting the assortment. For example, the buyer may be selecting a summer assortment that will be implemented on February 1. Individual items have their own Start Sell Dates, for example field 1536 in FIG. 7, that are independent of the Season Start Date 1802. Referring again to FIG. 10, Season End Date 1804 indicates the end of the time for which the buyer is selecting the assortment.

As discussed above, the profit functions and cost functions are shown in FIG. 11, which shows an exemplary item choice table 1900 associated with an embodiment of the invention. In an embodiment, the MCKP portion of the optimizer engine processes this table and chooses a maximum profit mixture of items and their quantities that does not exceed the cost constraint. Item ID 1504 indicates the item identifier. Item description 1506 includes a text description of the item. Choice 1902 indicates an index value corresponding to the quantity of an item. Index 1904 indicates an index value corresponding to an individual item.

Profit 1906 indicates the profit earned if the number of units corresponding to choice 1902 is purchased. Cost 1908 indicates the amount that it costs to purchase the number of units corresponding to choice 1902. Units 1910 indicates the number of units of the item corresponding to choice 1902.

As discussed above, the cost constraint is shown in FIG. 12, which shows an exemplary constraint table 2000 associated with an embodiment of the invention. Constraint 2002 indicates the limit on the money that can be spent on the assortment, for example $150,000. In the final assortment selection, the sum of all of the "Cost" values, such as from field 1908 in FIG. 19, must not exceed Constraint 2002.

To illustrate this embodiment in greater detail, specifically the way in which the selected numbers in FIG. 11 were generated, the following sample calculations are provided for Item 411, which corresponds to the first row in FIG. 7. From the first row of FIG. 8, the demand for Item 411 is 2390. From FIG. 7 the total lifecycle (1510) of Item 411 is 26 weeks. Since from FIG. 8 the number of entries (1604) is 1, the demand is understood to be uniformly spread across the 26 weeks of the item's lifecycle, making the weekly demand equal 2390/26=91.92. Since from FIG. 7 the minimum order quantity (MOQ 1526) for Item 411 is 1200, the first row of FIG. 11 has 1200 in the column for units 1910. In subsequent rows of FIG. 11, the units 1910 are incremented in steps of 48, the value given for the incremental order quantity 1528 in FIG. 7.

The highest number of units (1910) considered in FIG. 11 for Item 411 is 3552. To realistically bound the number of units considered, a bound on the total demand can be used. For the example shown here, the largest number of units considered in the distribution of Item 411 was taken as 3552, a value that is approximately 150% of the total demand (i.e., 1.5*2390=3585 from the first row of FIG. 8) and a multiple of the incremental order quantity (i.e., 3552/48=74 from the first row of FIG. 7). For each of the number of units considered, the profit model calculates a cost (1908) and profit (1906). As stated above, this embodiment contains a profit model that is based on a simulation. Demand is simulated throughout the item's lifecycle in weekly increments. Since Item 411 has a 26-week lifecycle, the simulation generates 26 random numbers, each of which represent the demand during one week of this item's lifecycle and each of which is shown under the weekly demand column of Table 5. As described above, a variety of distribution models (e.g., Poisson) may be used as the underlying distribution model for the demand. For This embodiment a normal distribution, which is characterized by a mean and a standard deviation, was used. Here the mean was taken to be 91.92, estimated weekly demand as described above. The standard deviation was set as 28.84, based on an analysis of historical data.

The cumulative demand in Table 5 is calculated by summing the weekly demand from all earlier weeks and is equal to the number of units of Item 411 that are sold when the supply is at least at that level. That is, the supply of units is the upper limit on the sales of the item. The cumulative sales column in Table 5 shows the cumulative number of units sold in all of the preceding weeks and is likewise limited by the supply. Only two examples of supply are shown—1200 and 3552 units—but the simulation performs similar calculations for each number of units (1910) of Item 411 that are shown in FIG. 11. The cost, or inventory cost, is calculated by multiplying the total units sold by the cost of a single unit. The sales income is calculated by multiplying the total units sold by the sales price of a single unit. The profit is then calculated by taking the difference between the sales income and the inventory cost. From FIG. 7 the unit cost (1512) of Item 411 is $14.12, and from FIG. 8 (row 3) the unit price is $24.00.

TABLE 5

Demand distribution values for Item 411.

| | Weekly | | Cumulative Sales | |
|---|---|---|---|---|
| Week | Demand | Cumulative Demand | Units = 1200 | Units = 3552 |
| 1 | 28 | 28 | 28 | 28 |
| 2 | 149 | 177 | 177 | 177 |
| 3 | 124 | 301 | 301 | 301 |
| 4 | 80 | 381 | 381 | 381 |
| 5 | 82 | 463 | 463 | 463 |
| 6 | 54 | 517 | 517 | 517 |
| 7 | 88 | 605 | 605 | 605 |
| 8 | 54 | 659 | 659 | 659 |
| 9 | 97 | 756 | 756 | 756 |
| 10 | 62 | 818 | 818 | 818 |
| 11 | 133 | 951 | 951 | 951 |
| 12 | 83 | 1034 | 1034 | 1034 |
| 13 | 64 | 1098 | 1098 | 1098 |
| 14 | 154 | 1252 | 1200 | 1252 |
| 15 | 80 | 1332 | 1200 | 1332 |
| 16 | 122 | 1454 | 1200 | 1454 |
| 17 | 118 | 1572 | 1200 | 1572 |
| 18 | 73 | 1645 | 1200 | 1645 |
| 19 | 65 | 1710 | 1200 | 1710 |
| 20 | 44 | 1754 | 1200 | 1754 |
| 21 | 61 | 1815 | 1200 | 1815 |

TABLE 5-continued

Demand distribution values for Item 411.

| Weekly | | | Cumulative Sales | |
|---|---|---|---|---|
| Week | Demand | Cumulative Demand | Units = 1200 | Units = 3552 |
| 22 | 59 | 1874 | 1200 | 1874 |
| 23 | 116 | 1990 | 1200 | 1990 |
| 24 | 105 | 2095 | 1200 | 2095 |
| 25 | 101 | 2196 | 1200 | 2196 |
| 26 | 133 | 2329 | 1200 | 2329 |
| | | Total Units Sold | 1200 | 2329 |
| | | Sales Income | $28,800.00 | $52,704.00 |
| | | Inventory Cost | $16,944.00 | $50,154.24 |
| | | Profit | $11,856.00 | $2,549.76 |

Both the consistency and the accuracy of the simulation increase when the user runs it repeatedly and then combines the results in some way such as averaging. FIG. 9 shows that the number of simulation trials (1706) for this calculation has been set to 10. The sample data in Table 5 illustrates the way in which the simulation works, but does so only for 1 of the 10 simulation trials. For this reason, the sample calculations are only approximately equal to the cost and profit shown in FIG. 11. For example, the Table 5 shows a profit of $2549.76 when the units equal 3552, whereas FIG. 11 shows a profit of $6867.36 for the same number of units. In order to make all of the numbers match exactly, all of the numbers, all 10 simulations would need to be combined.

As discussed above, solution values for the allocations are shown in FIG. 13, which shows an exemplary optimal solution table 2100 associated with an embodiment of the invention. Item ID 1504 indicates the item identifier. Item description 1506 includes a text description of the item. Choice 2102 indicates an index value corresponding to the optimal quantity of an item. Index 2104 indicates an index value corresponding to an individual item.

Units 2110 indicates the optimal number of units of the item. Profit 2106 indicates the profit earned if the optimal number of units 2110 is purchased. Cost 2108 indicates the amount that it costs to purchase the optimal number of units 2110.

As illustrated by the embodiment shown in FIGS. 7-13, the present invention enables stochastic optimization of allocations in a wide variety of operational settings including many practical business applications.

Although the invention has been described in conjunction with particular embodiments, it will be appreciated that various modifications and alterations may be made by those skilled in the art without departing from the spirit and scope of the invention. The invention is not to be limited by the foregoing illustrative details, but rather is to be defined by the appended claims.

What is claimed is:

1. An apparatus that determines allocations in a business operation to maximize profit on a computer system, comprising:
a memory; and
a processor that accesses the memory to retrieve computer-executable instructions to perform:
collecting profit data for a plurality of classes in the business operation, each class including an allocation having a cost function, the allocations being constrained by a total floor area, each class corresponding to a department of the business operation, and each allocation belonging to the group consisting of physical allocations and economic allocations;
determining profit functions for the allocations from the profit data by:
determining demand distributions for the allocations from the profit data;
determining a spatial allotment for each said department; and
determining each profit function from a corresponding demand distribution for the spatial allotment of each said department;
formulating a Multiple Choice Knapsack Problem to maximize profit based one the profit functions, the cost functions, and a cost constraint;
running the Multiple Choice Knapsack Problem to determine values for the allocations, by utilizing a solution vector holding allocation values, and a recursive function that rewrites allocation values into the solution vector by recursively running for possible allocations from 0 up to a predetermined maximum allocation for each class, wherein the recursive function improves local caching performance by evaluating possible allocations for each class in a sequentially increasing order; and
selecting the allocation values in the solution vector that maximize profit.

2. The apparatus according to claim 1, wherein each demand distribution includes a Poisson model.

3. The apparatus according to claim 1, wherein each demand distribution includes a Markov model.

4. The apparatus according to claim 1, wherein each demand distribution includes a normal distribution model.

5. The apparatus according to claim 1, wherein the allocations include spatial allotments.

6. The apparatus according to claim 1, wherein the allocations include monetary allotments.

7. The apparatus according to claim 1, wherein the cost constraint is a greater-than-or-equal-to inequality constraint.

8. The apparatus according to claim 1, wherein the cost constraint is an equality constraint.

9. The apparatus according to claim 1, wherein the cost constraint is a less-than-or-equal-to inequality constraint.

10. The apparatus of claim 1, wherein determining demand distributions for the allocations from the profit data comprises:
modeling the demand distributions with corresponding probabilistic functions.

11. The apparatus of claim 1, wherein a size of the solution vector is substantially equal to a value of the cost constraint.

12. The apparatus of claim 1, further including computer-executable instructions to perform:
before solving the Multiple Choice Knapsack Problem, ordering the plurality of classes by cost function.

13. The apparatus of claim 1, further including computer-executable instructions to perform:
before solving the Multiple Choice Knapsack Problem, removing a first item from a class when the item is dominated by a second item in the class, wherein the second item dominates the first item when the first and second item have substantially similar cost functions, but the second item has a higher profit function.

14. An apparatus that determines physical allocations in a business operation to maximize profit on a computer system, comprising:
a memory; and
a processor that accesses the memory to retrieve computer-executable instructions to perform:

collecting profit data for a plurality of classes in the business operation, each class including a allocation having a cost function, the allocations being constrained by a total floor area, each class corresponding to a department of the business operation, and each allocation belonging to the group consisting of physical allocations that include spatial allotments for the classes and economic allocations;

determining profit functions for the physical allocations from the profit data by:
  determining demand distributions for the allocations from the profit data;
  determining a spatial allotment for each said department; and
  determining each profit function from a corresponding demand distribution for the spatial allotment of each said department;

formulating a Multiple-Choice Knapsack Problem to maximize profit based on the profit functions, the cost functions, and a cost constraint; and running the Multiple Choice Knapsack Problem to determine values for the physical allocations, by utilizing a solution vector holding physical allocation values, and a recursive function that rewrites values into the solution vector by recursively running for possible physical allocations from 0 up to a predetermined maximum physical allocation for each class, wherein the recursive function improves local caching performance by evaluating possible physical allocations for each class in a sequentially increasing order; and selecting the physical allocation values in the solution vector that maximize profit.

15. The apparatus according to claim 14, wherein each demand distribution includes a Poisson model.

16. The apparatus according to claim 14, wherein each demand distribution includes a Markov model.

17. The apparatus according to claim 14, wherein each demand distribution includes a normal distribution model.

18. The apparatus according to claim 14, wherein the spatial allotments include widths for the classes and the cost constraint is a width constraint.

19. The apparatus according to claim 14, wherein the spatial allotments include advertising spaces for the classes and the cost constraint is an advertising space constraint.

20. The apparatus according to claim 14, wherein the spatial allotments include catalog spaces for the classes and the cost constraint is a catalog space constraint.

21. The apparatus according to claim 14, wherein the spatial allotments include floor spaces for the classes and the cost constraint is a floor space constraint.

22. The apparatus according to claim 14, wherein the cost constraint is a greater-than-or-equal-to inequality constraint.

23. The apparatus according to claim 14, wherein the cost constraint is an equality constraint.

24. The apparatus according to claim 14, wherein the cost constraint is a less-than-or-equal-to inequality constraint.

25. An apparatus that determines economic allocations in a business operation to maximize profit on a computer system, comprising:
  a memory; and
  a processor that accesses the memory to retrieve computer-executable instructions to perform:
    collecting profit data for a plurality of classes in the business operation, each class including an allocation having a cost function, the allocations being constrained by a total floor area, each class corresponding to a department of the business operation, and each allocation belonging to the group consisting of physical allocations and economic allocations that include monetary allotments for the classes;
    determining profit functions for the economic allocations from the profit data by:
      determining demand distributions for the allocations from the profit data;
      determining a spatial allotment for each said department; and
      determining each profit function from a corresponding demand distribution for the spatial allotment of each said department;
    formulating a Multiple Choice Knapsack Problem to maximize profit based on the profit functions, the cost functions, and a cost constraint; and
    running the Multiple Choice Knapsack Problem to determine values for the economic allocations, by utilizing a solution vector holding economic allocation values, and a recursive function that rewrites values into the solution vector by recursively running for possible economic allocations from 0 up to a predetermined maximum economic allocation for each class, wherein the recursive function improves local caching performance by evaluating possible economic allocations for each class in a sequentially increasing order; and
    selecting the economic allocation values in the solution vector that maximize profit.

26. The apparatus according to claim 25, wherein each demand distribution includes a Poisson model.

27. The apparatus according to claim 25, wherein each demand distribution includes a Markov model.

28. The apparatus according to claim 25, wherein each demand distribution includes a normal distribution model.

29. The apparatus according to claim 25, wherein the cost constraint is a monetary constraint.

30. The apparatus according to claim 25, wherein the cost constraint is a greater-than-or-equal-to inequality constraint.

31. The apparatus according to claim 25, wherein the cost constraint is an equality constraint.

32. The apparatus according to claim 25, wherein the cost constraint is a less-than-or-equal-to inequality constraint.

33. The apparatus of claim 25, wherein a size of the solution vector is substantially equal to a value of the cost constraint.

34. The apparatus of claim 25, further including computer-executable instructions to perform:
  before solving the Multiple Choice Knapsack Problem, ordering the plurality of classes by cost function.

35. The apparatus of claim 25, further including computer-executable instructions to perform:
  before solving the Multiple Choice Knapsack Problem, removing a first item from a class when the item is dominated by a second item in the class, wherein the second item dominates the first item when the first and second item have substantially similar cost functions, but the second item has a higher profit function.

36. A system for determining allocations in a business operation to maximize profit, comprising:
  a data unit, the data unit having a memory that includes profit data for a plurality of classes in the business operation, each class including an allocation having a cost function that is stored in the memory, and the memory also including a cost constraint, the allocations being constrained by a total floor area, each class corresponding to a department of the business operation, and each allocation belong to the group consisting of physical allocations and economic allocations;

a profit-model unit, the profit-model unit being connected to the data unit, and the profit-model unit including executable instructions for determining profit functions for the allocations from the profit data, wherein determining the profit functions includes:

determining demand distributions for the allocations from the profit data;

determining a spatial allotment for each said department; and determining each profit function from a corresponding demand distribution for the spatial allotment of each said department; and an optimization-engine-unit, the optimization-engine unit being connected to the data unit and the profit-model unit, the optimization-engine unit including executable instructions for formulating a Multiple Choice Knapsack Problem to maximize profit based on the profit functions, the cost functions, and the cost constraint, for creating a solution vector holding allocation values, and for running the Multiple Choice Knapsack Problem to determine values for the allocations, by utilizing a recursive function that rewrites values into the solution vector-by recursively running for possible physical from 0 up to a predetermined maximum allocation for each class, wherein the recursive function improves local caching performance by evaluating possible allocations for each class in a sequentially increasing order; and wherein the optimization-engine unit including executable instructions for selecting the allocation values in the solution vector that maximize profit.

37. A system according to claim 36, wherein each demand distribution includes a Poisson model.

38. A system according to claim 36, wherein each demand distribution includes a Markov model.

39. A system according to claim 36, wherein each demand distribution includes a normal distribution model.

40. A system according to claim 36, wherein the allocations include spatial allocations.

41. A system according to claim 36, wherein the allocations include economic allocations.

42. A system according to claim 36, wherein the cost constraint is a greater-than-or-equal-to inequality constraint.

43. A system according to claim 36, wherein the cost constraint is an equality constraint.

44. A system according to claim 36, wherein the cost constraint is a less-than-or-equal-to inequality constraint.

45. Computer-readable media tangibly embodying a program for determining allocations in a business operation to maximize profit, the program including executable instructions for:

collecting profit data for a plurality of classes in the business operation, each class including an allocation having a cost function, the allocations being constrained by a total floor area, each class corresponding to a department of the business operation, and each allocation belonging to the group consisting of physical allocations and economic allocations;

determining profit functions for the allocations from the profit data by:

determining demand distributions for the allocations from the profit data;

determining a spatial allotment for each said department; and determining each profit function from a corresponding demand distribution for the spatial allotment of each said department;

formulating a Multiple Choice Knapsack Problem to maximize profit based on from the profit functions, the cost functions, and a cost constraint; and solving the Multiple Choice Knapsack Problem to determine values for the allocations, by utilizing a solution vector holding allocation values, and a recursive function that rewrites values into the solution vector by recursively running for possible allocations from 0 up to a predetermined maximum allocation for each class, wherein the recursive function improves local caching performance by evaluating possible allocations for each class in a sequentially increasing order; and selecting the allocation values in the solution vector that maximize profit.

46. Computer-readable media as claimed in claim 45, wherein each demand distribution includes a Poisson model.

47. Computer-readable media as claimed in claim 45, wherein each demand distribution includes a Markov model.

* * * * *